(12) United States Patent
Arakawa et al.

(10) Patent No.: US 6,894,248 B2
(45) Date of Patent: May 17, 2005

(54) LASER BEAM MACHINING APPARATUS

(75) Inventors: Yoshifumi Arakawa, Tokyo (JP);
Shigeru Yokoi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/483,954

(22) PCT Filed: May 20, 2003

(86) PCT No.: PCT/JP03/06288

§ 371 (c)(1),
(2), (4) Date: Jan. 16, 2004

(87) PCT Pub. No.: WO2004/103633

PCT Pub. Date: Dec. 2, 2004

(65) Prior Publication Data

US 2005/0061778 A1 Mar. 24, 2005

(51) Int. Cl.[7] .......................... B23K 26/00; B23K 26/12
(52) U.S. Cl. ............................. 219/121.67; 219/121.83; 219/121.84
(58) Field of Search ............ 219/121.6, 121.63–121.72, 219/121.83–121.86

(56) References Cited

U.S. PATENT DOCUMENTS 5,675,070 A * 10/1997 Gelperin ..................... 73/23.34
5,904,869 A * 5/1999 Saito et al. ............. 219/121.68
6,159,659 A * 12/2000 Gelbart ....................... 430/306

FOREIGN PATENT DOCUMENTS

| JP | 404101648 A | * | 4/1992 |
| JP | 5-8079 A | | 1/1993 |
| JP | 5-212575 A | | 8/1993 |
| JP | 6-17120 A | | 1/1994 |
| JP | 10-34372 A | | 2/2003 |

* cited by examiner

*Primary Examiner*—Samuel M. Heinrich
(74) *Attorney, Agent, or Firm*—Sughrue Mion, PLLC

(57) ABSTRACT

A laser beam machining apparatus includes a laser oscillator, a machining head which that machines a workpiece using the laser beam. An optical duct has an optical system to guide the laser beam from the laser oscillator to the machining head. Purge gas is supplied into the optical duct from a purge gas supply port, and the purge gas is output from a purge gas exhaust port. A detector detects presence of undesired gas in the optical duct.

19 Claims, 18 Drawing Sheets

FIG.8

| FIRST GAS DETECTOR | SECOND GAS DETECTOR | CONCEIVABLE CAUSES OF ANOMALY |
|---|---|---|
| ○ | ○ | NONE (NORMAL) |
| × | ○ | TRANSMISSION LINE PORTION |
| × | × | 1: COMPRESSOR AND ITS VICINITY<br>2: TRANSMISSION LINE PARTS |

○ : NORMAL
× : ANOMALY DETECTED

FIG.13

| FIRST GAS DETECTOR | SECOND GAS DETECTOR | THIRD GAS DETECTOR | CONCEIVABLE CAUSES OF ANOMALY | GROUP |
|---|---|---|---|---|
| ○ | ○ | ○ | NONE (NORMAL) | A |
| ○ | ○ | × | PERIPHERY OF COMPRESSOR | B |
| × | ○ | ○ | TRANSMISSION LINE | C |
| × | ○ | × | PERIPHERY OF COMPRESSOR, TRANSMISSION LINE PARTS | B |
| × | × | ○ | 1: COMPRESSOR<br>2: TRANSMISSION LINE PARTS | B |
| × | × | × | 1: PERIPHERY OF COMPRESSOR<br>2: COMPRESSOR<br>3: TRANSMISSION LINE PARTS | B |

○: NORMAL
×: ANOMALY DETECTED

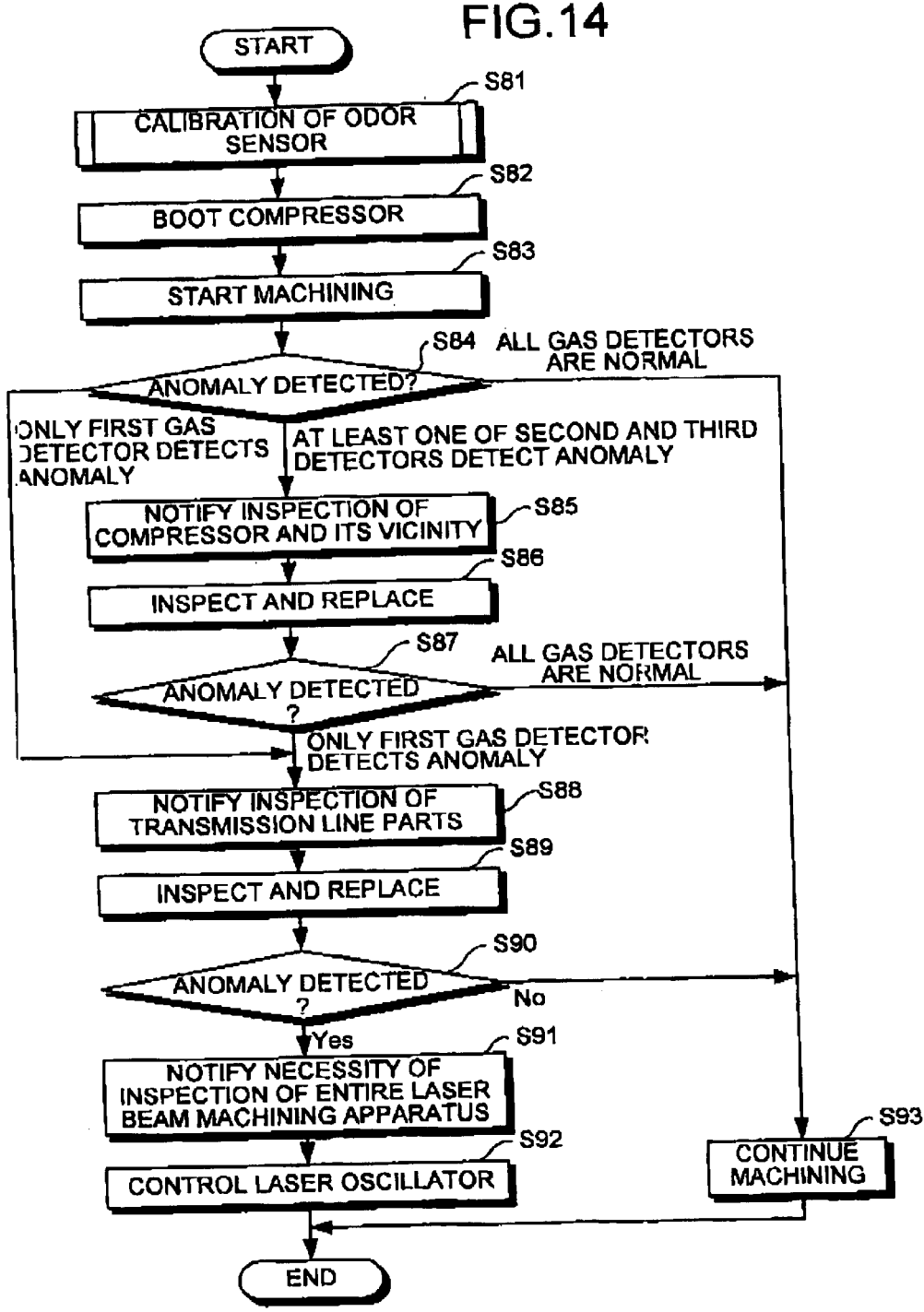

LASER BEAM MACHINING APPARATUS

TECHNICAL FIELD

The present invention relates to a laser beam machining apparatus which carries out welding and cutting and is capable of detecting mixing of impure gas in purge gas filling a light guide duct guiding a laser beam.

BACKGROUND ART

Various types of laser machining apparatuses are known. For example, Japanese Patent Application Laid-Open Publication No. 5-8079 (see page 2, FIGS. 1 and 2) discloses a conventional laser beam machining apparatus that transmits a laser beam stably for long time and can weld and cut a subject to be machined with high accuracy. This laser beam machining apparatus includes a laser oscillator, a laser robot, an optical duct, and a machining gas supply unit. The laser oscillator has a beam transmission line including a laser outgoing port of an airtight mechanism. The laser robot has an articulated configuration which can emit a laser beam to an arbitrary position of the subject to be machined. The optical duct guides the laser beam so that an optical axis of the laser beam between the laser oscillator and the laser robot does not shift. The machining gas supply unit detects pressure in the optical duct and supplies a predetermined machining gas into the optical duct so that the pressure in the optical duct becomes higher than external pressure. Such a configuration prevents fume and dust generated at the time of the laser beam machining from entering the optical duct through a tip of the laser robot.

Japanese Patent Application Laid-Open Publication No. 6-17120 (see pages 2 to 3, FIG. 1) discloses a laser annealing apparatus capable of controlling intensity of a laser beam accurately according to a condition where a subject to be machined undergoes a laser annealing process. The laser annealing apparatus has such a configuration that the laser oscillator and a chamber in which the subject to be machined and to undergo the laser annealing process is arranged are connected by the optical duct. The laser annealing apparatus adjusts the intensity of the laser beam emitted to the subject to be machined in the chamber based on purge gas which does not absorb the laser beam transmitting through the optical duct, and concentration of control gas having predetermined absorptance with respect to the laser beam. The optical duct, therefore, has a detecting sensor which detects the concentration of the control gas in the optical duct, and a quantity of the control gas to be supplied into the optical duct is controlled based on a signal obtained in such a manner that the detecting sensor detects the concentration of the control gas.

In the conventional laser beam machining apparatus disclosed in Japanese Patent Application Laid-Open Publication No. 5-8079, however, air might enter the optical duct. One of causes that the air enters the optical duct is a configuration of the optical duct. As shown in FIG. 1 of this publication, for example, the optical duct which connects the laser oscillator and the laser robot does not have a linear form, and the optical path is bent at a plurality of portions. Such an optical duct is normally constituted so that bellows or the like connects a plurality of pipes. The laser beam machining apparatus of the first prior art has the laser robot in which a position to which the laser beam is emitted can be moved so that the laser beam can be emitted to an arbitrary position of a subject to be machined. In the laser beam machining apparatus having such a configuration, for example, a bellows section composing a part of the optical duct occasionally moves according to a changing operation of the emitting position of the laser robot which is performed in order to change the laser beam emitting position, or when the laser beam machining is stopped, pressure in the optical duct temporarily drops. As a result, for example, outside air enters the optical duct through joints of the pipes composing the optical duct or joints between the pipes and the bellows.

Another cause that the air might enter the optical duct is machining gas to be supplied into the optical duct, and this is caused by using air sucked from a compressor into the optical duct as the machining gas.

If the air enters the optical duct, when thinner, paint, or the like is used in a vicinity of the optical duct, impure gas such as laser beam absorbing gas (thinner, trichloroethylene, acrylic combustion gas, fluorocarbon gas, $SF_5$, organic compound, and the like) enters the optical duct. The impure gas causes power distribution of the laser beam and increase in attenuation of the laser beam, and as a result, characteristics of the laser beam are deteriorated, and thus machining ability of the laser beam machining apparatus is deteriorated.

When anomalous output of the laser beam occurs, a defect in the laser oscillator is firstly regarded as a cause of the fault. After various factors which cause the fault in the output of the laser beam are eliminated, it is frequently found that the intrusion of the impure gas into the optical duct is the cause of the anomalous output of the laser beam. That is to say, the impure gas in the optical duct cannot be specified as the cause of the anomalous output of the laser beam in the early stage of the checkup of the causes. During the checkup of the causes, therefore, the machining cannot be carried out by the laser beam machining apparatus, and thus the impure gas is also a cause for deteriorating working efficiency.

In the laser annealing apparatus disclosed in Japanese Patent Application Laid-Open Publication No. 6-17120, the detecting sensor which detects the control gas is provided in the optical duct, but the detecting sensor detects the concentration of the control gas which controls the output of the laser beam and does not detect the impure gas. That is to say, even if the impure gas such as the laser absorbing gas enters the optical duct, the detecting sensor cannot detect the intrusion of the impure gas.

It is an object of the present invention to solve at least the problems in the conventional technology.

DISCLOSURE OF THE INVENTION

A laser beam machining apparatus according to the present invention includes a laser oscillator which oscillates a laser beam, the laser oscillator having a laser beam outgoing port to output the laser beam; a machining head which machines a workpiece with the laser beam; an optical duct with an optical system to guide the laser beam from the laser beam outgoing port to the machining head; a purge gas supply port that opens into the optical duct and situated near any one of the laser beam outgoing port and the machining head, wherein a purge gas supply unit supplies purge gas into the optical duct from the purge gas supply port; a purge gas exhaust port that opens into the optical duct and situated near any one of the laser beam outgoing port and the machining head, wherein the purge gas in the optical duct is output from the purge gas exhaust port; and an odor sensor that detects undesired gas in a portion of the optical duct from the laser beam outgoing port to the machining head, wherein the undesired gas is a gas that makes the laser beam anomalous.

BRIEF DESCRIPTION OF THE DRAWINGS

FIG. 8 is to explain how the odor sensor detects anomalous portions;

FIG. 13 is to explain how the odor sensor detects anomalous portions in the laser beam machining apparatus according to the fifth embodiment;

FIG. 14 is a flowchart of a process to detect an anomaly in the laser beam machining apparatus according to the fifth embodiment;

BEST MODE FOR CARRYING OUT THE INVENTION

Figure 1:
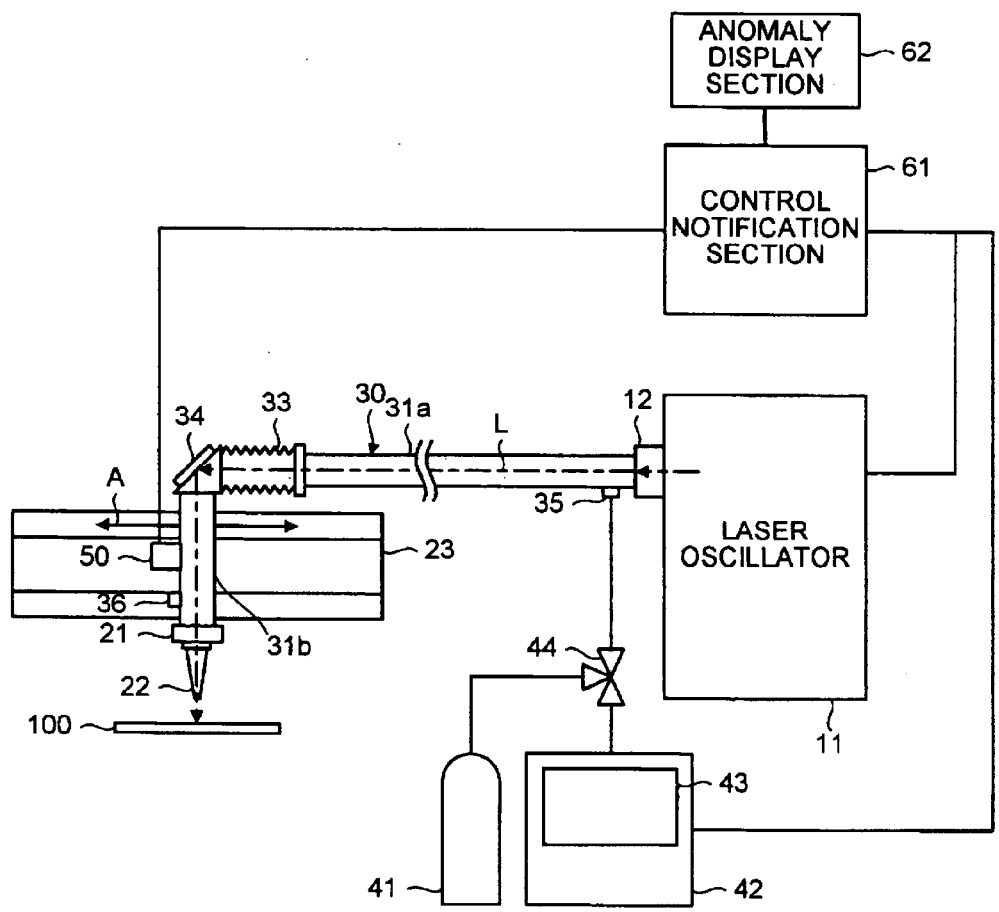
FIG. 1 is a schematic diagram of a laser beam machining apparatus according to a first embodiment of the present invention.
Figure 2:
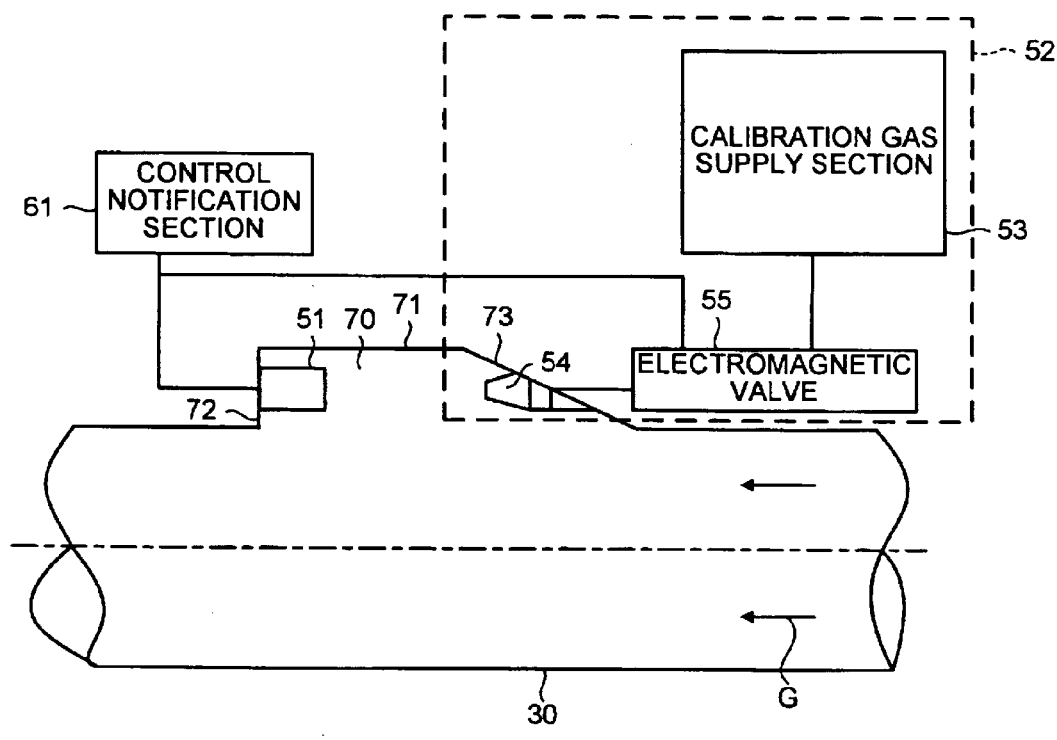
FIG. 2 illustrates how a gas detector is attached to an optical duct.
Figure 3:
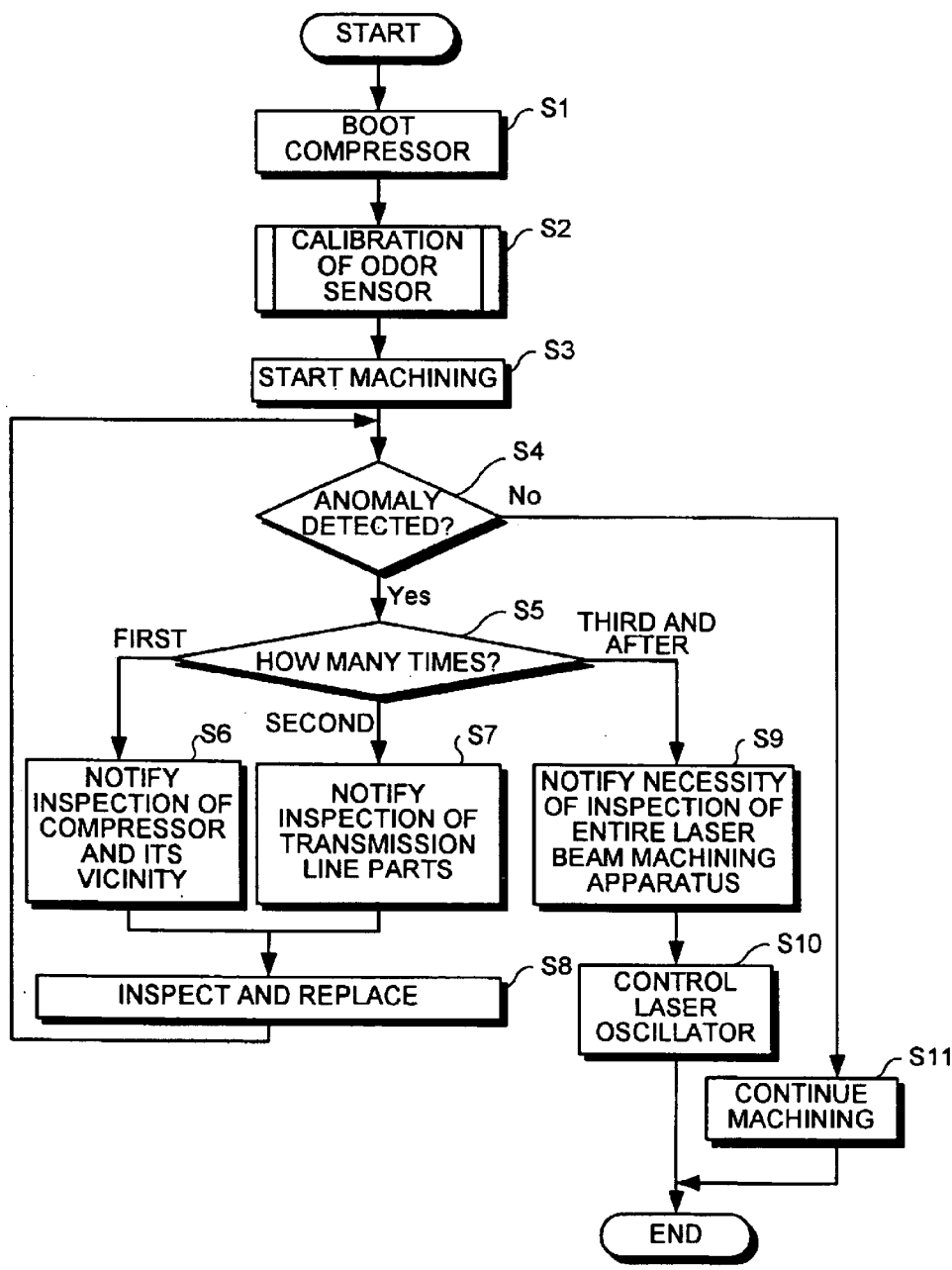
FIG. 3 is a flowchart of a process to detect anomaly in the laser beam machining apparatus according to the first embodiment.
Figure 4:
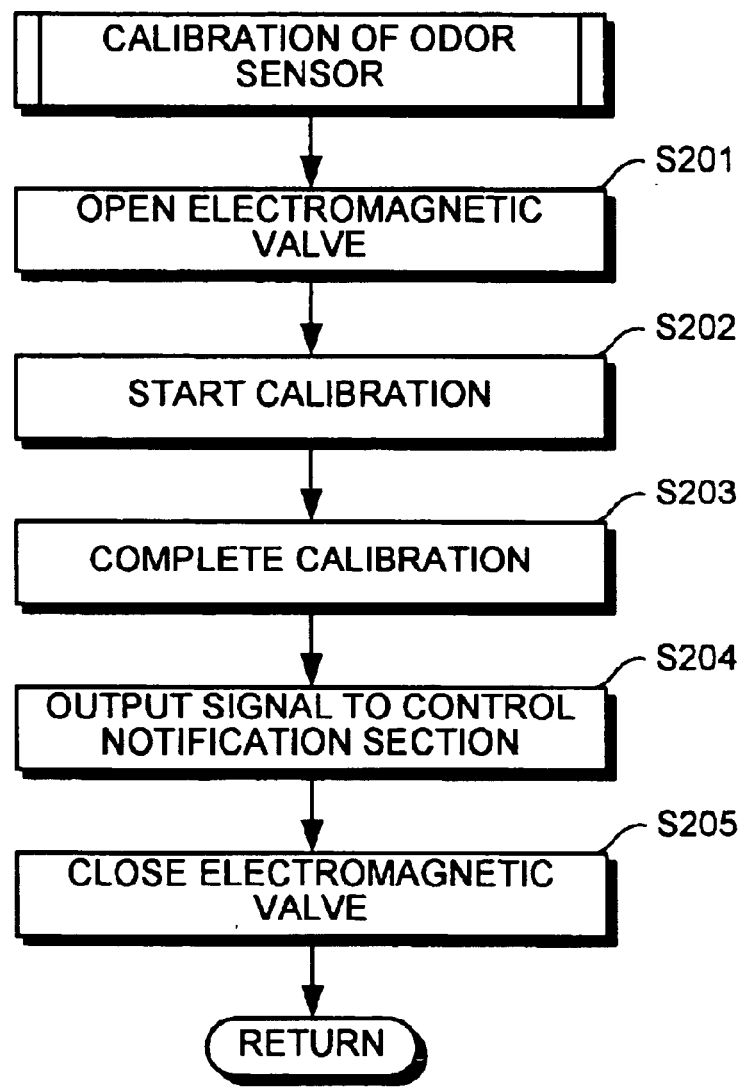
FIG. 4 is a flowchart of a process of calibration executed using the gas detector.

Exemplary embodiments of laser beam machining apparatus according to the present invention are explained in detail with reference to the accompanying drawings.
First Embodiment A first embodiment of the present invention is explained with reference to FIGS. 1 to 4. FIG. 1 is a schematic diagram of the laser beam machining apparatus according to the first embodiment of the present invention. FIG. 2 illustrates how a gas detector is attached to an optical duct. FIG. 3 is a flowchart of a process to detect anomaly in the laser beam machining apparatus according to the first embodiment. FIG. 4 is a flowchart of a process of calibration executed using the gas detector.

The laser beam machining apparatus includes a laser oscillator 11, such as a carbon dioxide gas laser oscillator (oscillation wavelength: 10.6 micro millimeters) which oscillates a laser beam, a machining head 21 which emits a laser beam output from the laser oscillator 11 to a workpiece (subject to be machined) 100 to be machined, and an optical duct 30 which guides the laser beam emerged from the laser oscillator 11 to the machining head 21 while an optical axis of the laser beam is maintained. In the drawings, an alternate long and short dash line L shows the laser beam.

The optical duct 30 is shaped as English letter L. In other words, two pipes 31a and 31b are joined at right angle via a stretchable bellows 33. An optical system such as a bend mirror 34 is provided into the optical duct 30 so as to guide the laser beam L from a laser beam outgoing port 12 of the laser oscillator 11 to the machining head 21 and condensing the laser beam L onto a tip (hereinafter, a machining head tip) 22 of the machining head 21. For example, the bend mirror 34 bends a path of the laser beam L emitted from the laser beam outgoing port 12 of the laser oscillator 11 towards the machining head 21 by 90 degrees in the configuration of FIG. 1. The pipe 31b connected with the machining head 21 can move to a direction of an arrow A in the drawing along a frame 23 by a guiding configuration or a driving mechanism, not shown, so that a relative moving operation is performed between the laser beam L and the workpiece 100. According to the movement of the pipe 31b connected with the machining head 21 along the frame 23, the bellows 33 expands and contracts.

A purge gas supply port 35 which is used for supplying purge gas which does not affect absorptance of the laser beam L passing through the optical duct 30 is provided in a vicinity of the laser beam outgoing port 12 of the laser oscillator 11 on the optical duct 30. A purge gas exhaust port 36 to exhaust the purge gas out of the optical duct 30 is provided near the machining head 21 on the optical duct 30. The purge gas supply port 35 is connected with a nitrogen supply section 41 and a compressor 42 via a valve 44 which is switched exclusively. The nitrogen supply section 41 supplies nitrogen as the purge gas. The compressor 42 supplies sucked and compressed air as the purge gas. An inlet port which sucks air of the compressor 42 has a filter 43. The filter 43 is composed of activated carbon or the like having a function for eliminating moisture, dust, organic compound, and the like in a room where the laser beam machining apparatus is installed so as to prevent them from intruding into the optical duct 30. The pressure in the optical duct 30 is set to be predetermined pressure (for example, when air (purge air) is used as the purge gas, a flow rate is 100 L/min., and a pressure difference is not less than 0.06 kPa) by the purge gas supply port 35 and the purge gas exhaust port 36 provided on the optical duct 30. The laser beam machining apparatus further includes at least one gas detector 50, a control notification section 61, and an anomaly display section 62. The gas detector 50 detects intrusion of impure gas in the optical duct 30 and outputs an anomaly detection signal. The control notification section 61 controls the laser beam machining apparatus and when receiving the anomaly detection signal from the gas detector 50, notifies anomaly to a operator of the laser beam machining apparatus. The anomaly display section 62 makes the operator recognize the anomaly by means of the notification from the control notification section 61. The control notification section 61 controls the laser oscillator 11 based on the anomaly detection signal output from the gas detector 50 and a filter replacement signal which is output from the compressor 42 when the filter 43 is replaced, and controls the entire laser beam machining apparatus based on an instruction from the operator. The control positing section 61 controls calibration of the gas detector 50 when the laser beam machining apparatus is booted. The anomaly display section 62 is composed of, for example, a CRT (Cathode Ray Tube), a liquid crystal display, an indicator which notifying various anomalies, or a buzzer which is provided in the laser beam machining apparatus. The control notification section 61 notifies the anomaly due to the intrusion of the impure gas to the operator.

The gas detector 50 includes, as shown in FIG. 2, an odor sensor 51 which detects the impure gas in the optical duct 30, and a sensor calibrator 52 which calibrates the odor sensor 51 when the laser beam machining apparatus is booted. The gas detector 50 is provided on a concave portion 70 which is formed in such a manner that a portion of a side wall of the optical duct 30 is dented from the inside to the outside of the optical duct 30. The concave portion 70 has a surface parallel with an optical axis in the optical duct 30. The concave portion 70 is formed so as to be surrounded by a peripheral surface 71 connected with the optical duct 30, a first side surface 72 which is positioned on a lower stream side of the concave portion 70 and connects an outer peripheral surface of the optical duct 30 with the peripheral surface 71 of the concave portion 70, and a second side surface 73 which is positioned on an upper stream side of the concave portion 70 and connects the outer peripheral surface of the optical duct 30 with the peripheral surface 71 of the concave portion 70. The first side surface 72 has an angle which is approximately vertical to an extended direction of the optical duct 30, but the second side surface 73 has an angle of tilt which is not vertical but gentle from an inner wall of the optical duct 30 towards the peripheral surface 71 of the concave portion 70 which is the farthest from a center of the optical duct 30.

The odor sensor 51 is provided on the first side surface 72 of the concave portion 70 so as to oppose to a flow of the purge gas G flowing in the optical duct 30. As the odor sensor 51, a hot wire semiconductor sensor which can detect atmosphere components such as combustible gas, toxic gas, and odor component can be used. The hot wire semiconductor sensor has a two-terminal configuration that includes a gas sensitive section and a lead wire section. The gas sensitive section is constituted so that a metallic oxide semiconductor such as tin oxide is arranged around a coil which is formed by a linear resister made of noble metal wire such as a platinum or platinum alloy wire. The lead wire section is constituted so that both ends of the linear resister are extended to the outside of the gas sensitive section. The gas detector is electrically connected with the linear resister of the hot wire semiconductor sensor having such a configuration so as to have a predetermined temperature, and detects a change in resistance of the gas sensitive section due to gas absorption so as to detect the gas component. As the odor sensor, for example, a hot wire semiconductor sensor CH-E (model name) made by New Cosmos Electric Co., Ltd. can be used.

The sensor calibrator 52 includes a calibration gas supply section 53, a nozzle 54, and an electromagnetic valve 55. The calibration gas supply section 53 supplies gas for calibration of the odor sensor 51 (hereinafter, "calibration gas"). The nozzle 54 is arranged on the second side surface 73 of the concave portion 70 opposed to the odor sensor 51 (so that the calibration gas is blown to the same direction as the flow of the purge gas G). The electromagnetic valve 55 controls so as to supply the calibration gas into the optical duct 30 at the time of the calibration and not to supply the calibration gas into the optical duct 30 at time other than the calibration. Opening and closing states of the electromagnetic valve 55 are controlled by the control notification section 61.

The sensor calibrator 52 obtains a standard of the operation of the odor sensor 51 in the environment without the impure gas in order to detect a change in the odor sensor 51 when the impure gas intruded. For this reason, it is desirable that the calibration gas supply section 53 supplies gas with the same composition as that of the purge gas G supplied at the time of the laser beam machining. Even if, however, the gas does not have the same composition as that of the purge gas G, the calibration gas supply section 53 may supply nitrogen gas or oxygen gas, which is not detected by the odor sensor 51, as the calibration gas. That the calibration gas is allowed to flow in the odor sensor 51 in order to obtain an initial value for determination which state is not anomalous is called as calibration.

The gas detector 50 is provided near the purge gas exhaust port 36 of the optical duct 30 in the laser beam machining apparatus so as to detect the intrusion of the impure gas into the optical duct 30 which causes the anomalies such as the power distribution of the laser beam L and the increase in attenuation of the laser beam L. The impure gas can be detected, therefore, made at an initial state whether the anomalies of the laser beam L are caused by the impure gas or another reason.

The process to detect an anomaly in the laser beam machining apparatus will be explained using FIG. 3. To boot the laser beam machining apparatus, the compressor 42 is booted (step S1) whereby the optical duct 30 is filled with gas (air).

Next, calibration of the odor sensor 51 is executed (step S2) as shown in FIG. 4. The electromagnetic valve 55 which is provided between the calibration gas supply port 53 and the nozzle 54 is opened (step S201), and calibration gas is blown from the nozzle 54 onto the odor sensor 51 so that the calibration is started (step S202). The calibration gas is blown onto the odor sensor 51 for predetermined time (normally, a few minutes), and when the calibration is ended (step S203), the odor sensor 51 outputs a signal showing completion of the calibration to the control notification section 61 (step S204). The control notification section 61 closes the electromagnetic valve 55 (step S205), so that the calibration process is ended.

Referring again to FIG. 3, upon completion of the calibration of the odor sensor 51, the workpiece 100 is located on a predetermined position and the workpiece 100 is machined (step S3). During the machining, the odor sensor 51 continues to detect an anomaly, that is, intrusion of the impure gas in the optical duct 30 (step S4). When there is no anomaly (No at step S4), the machining is continued (step S12).

Referring again to FIG. 3, upon completion of the calibration of the odor sensor 51, the workpiece 100 is located on a predetermined position and the workpiece 100 is machined (step S3). During the machining, the odor sensor 51 continues to detect an anomaly, that is, intrusion of the impure gas in the optical duct 30 (step S4). When there is no anomaly (No at step S4), the machining is continued (step S11).

When such a notice is displayed, the operator inspects the compressor 42 and its vicinity for anomaly (step S8).

Particularly, the operator inspects the atmosphere around the compressor 42, and when anomaly is not found, the filter 43 of the compressor 42 is replaced. When the filter 43 of the compressor 42 is replaced, in a state where the compressor 42 is connected with the optical duct 30, the valve 44 is switched so that the nitrogen supply section 41 is connected with the optical duct 30, so that the nitrogen is supplied to the optical duct 30. The filter 43 provided at the inlet port of the compressor 42 is replaced, and after the replacement of the filter 43, the compressor 42 outputs a replacement completion signal showing that the replacement is completed to the control notification section 61. In the state where the nitrogen supply section 41 is connected with the optical duct 30, the valve 44 is switched so that the compressor 42 is connected with the optical duct 30, so that the air is again supplied into the optical duct 30. The valve 44 may be switched by the control notification section 61 or by the operator. At the time of switching by the control notification section 61, when the control notification section 61 receives the anomaly detection signal from the odor sensor 51, the valve 44 is switched from the compressor 42 to the nitrogen supply section 41. When the control notification section 61 receives the replacement completion signal from the compressor 42, the valve 44 may be switched from the nitrogen supply section 41 to the compressor 42. During the inspection, the laser beam machining process can be continued by using nitrogen gas as the purge gas.

Upon completion of the inspection, the system control returns to step S4, and the odor sensor 51 again detects whether there is an anomaly. When there is an anomaly (Yes at step S4), the odor sensor 51 outputs the anomaly detection signal to the control notification section 61. The control notification section 61 decides as to how many times the anomaly detection signal is received after the laser beam machining apparatus is booted (step S5). When an anomaly detection signal is received for the second time ("second" in FIG. 3), the control notification section 61 sends information to the anomaly display section 62 to display a notice to inspect transmission line parts (step S7). This information is displayed on the anomaly display section 62.

When such a notice is displayed, the operator inspects the transmission line parts such as the pipes 31a and 31b and the bellows 33 of the optical duct 30 to be the transmission line of the laser beam L for burning and deterioration. If the operator finds faulty parts, he replaces the faulty parts (step S8).

Upon completion of the inspection, the system control returns to step S4, and the odor sensor 51 again detects whether there is an anomaly (step S4). When there is an anomaly (Yes at step S4), the odor sensor 51 outputs the anomaly detection signal to the control notification section 61. The control notification section 61 decides how many times the anomaly detection signal is received after the laser beam machining apparatus is booted (step S5). When an anomaly detection signal is received for the third time or more ("third and after" in FIG. 3), the control notification section 61 sends information to the anomaly display section 62 to display a notice to inspect the entire laser beam machining apparatus (step S7). This information is displayed on the anomaly display section 62.

Upon receiving of the information, the operator judges whether the machining can be carried out without affecting machining quality if the output of the laser oscillator 11 is lowered. The laser oscillator 11 is controlled based on the result of the judgment (step S10). When it is possible to carry out the machining without affecting the machining quality by lowering the output of the laser beam L, for example, the control notification section 61 adjusts the output of the laser oscillator 11 to a level where the machining quality is not affected, and the machining is continued. The process ends after the machining is completed. Meanwhile, if it is difficult to carry out the machining even after lowering the output of the laser beam L, the control notification section 61 stops the laser oscillator 11. The operator inspects the parts in the laser beam machining apparatus such as a machine including the frame 23 and the laser oscillator 11 except for the inspected and replaced compressor 42 and the optical duct 30. When anomaly is found, the operator replaces an anomalous part, and the process is ended.

According to the first embodiment, the odor sensor 51 is provided near the purge gas exhaust port 36 so as to be capable of detecting the intrusion of the impure gas in the entire purge gas G in the optical duct 30. The intrusion of the impure gas can be specified as a cause of the anomalous laser beam L, as a result. The odor sensor 51 outputs the anomaly detection signal to the control notification section 61 so that a cause of the anomaly can be checked upon effectively. A replacement timing of the filter 43 provided to the inlet port of the compressor 42 can be judged based on the cause. The laser oscillator 11 can be controlled based on the anomaly detection signal from the control notification section 61.

The odor sensor 51 is mounted to the first side surface 72 on the concave portion 70 of the optical duct 30 so as to be opposed to the flow of the purge gas G, and the nozzle 54 is mounted to the second side surface 73 on the concave portion 70 just in front of the odor sensor 51 so that a flowing direction of the calibration gas is the same as that of the purge gas G. The calibration of the odor sensor 51 can be, therefore, executed efficiently. Since the second side surface 73 is formed so as to tilt from the upper stream side of the optical duct 30 to the peripheral surface 71 of the concave portion 70, the purge gas G easily flows into the concave portion 70, so that the odor sensor 51 can detect the impure gas effectively.

Figure 5:
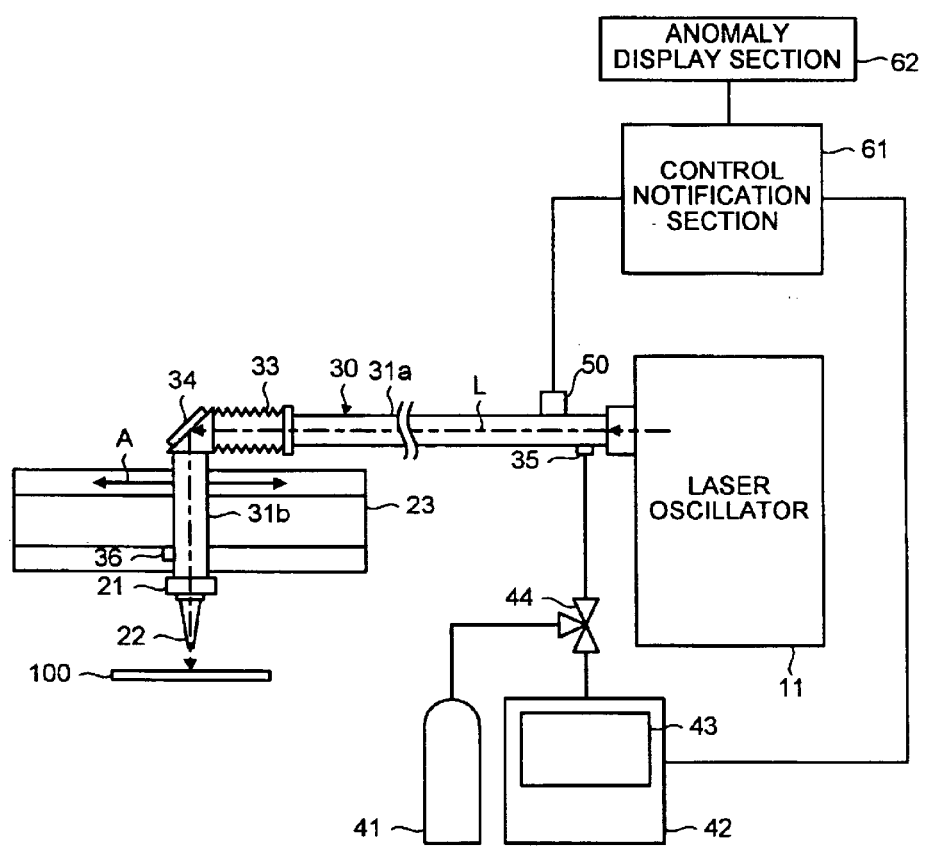
FIG. 5 is a schematic diagram of a laser beam machining apparatus according to a second embodiment of the present invention.
Figure 6:
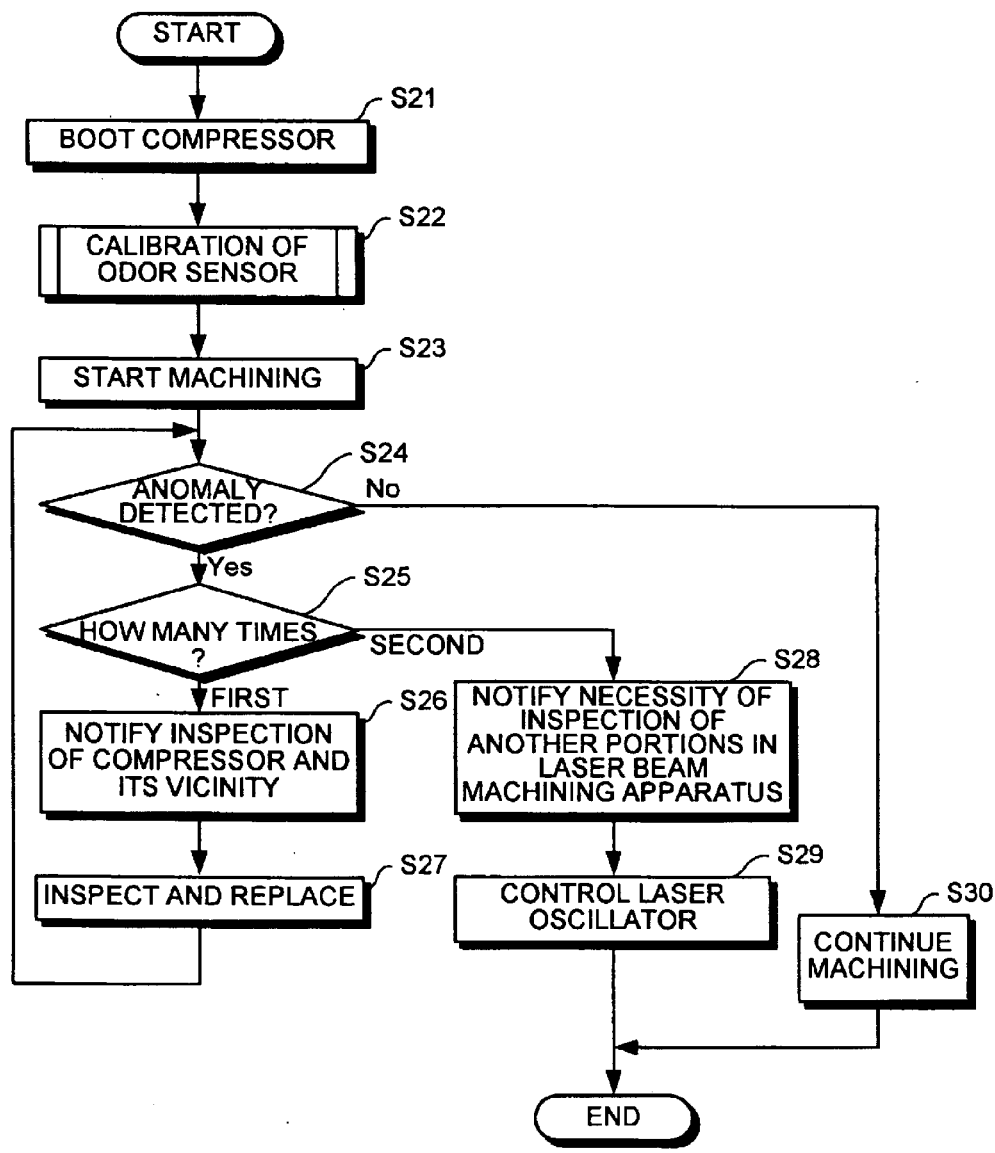
FIG. 6 is a flowchart of a process to detect an anomaly in the laser beam machining apparatus.

FIG. 5 is a schematic diagram of a laser beam machining apparatus according to a second embodiment of the present invention. FIG. 6 is a flowchart of a process to detect an anomaly in the laser beam machining apparatus. Components which have same or similar configuration or same or similar functions as those in FIG. 1 are designated by the same reference numbers, and the explanation thereof is omitted.

As shown in FIG. 5, in the laser beam machining apparatus of the second embodiment, the gas detector 50 is positioned near the purge gas supply port 35. Although not shown, the gas detector may be provided in plurality. The other parts of configuration are the same as those in FIG. 1. It is preferable that the gas detector 50 is positioned opposite to the purge gas supply port 35 or slightly down stream side. The gas detector 50 is provided on the concave portion 70 on the optical duct 30 as shown in FIG. 2 of the first embodiment. The gas detector 50 is provided near the purge gas supply port 35, so as to be capable of immediately detecting the impure gas which intrudes from the compressor 42, for example.

The process of detecting an anomaly in the laser beam machining apparatus according to the second embodiment is explained using FIG. 6. The steps S1 to S4 and S11 are same as those explained with reference to FIG. 3 and correspond to steps S21 to S24 and S30 respectively in FIG. 6. That is to say, after the compressor 42 is booted (step S21) whereby the optical duct 30 is filled with gas (air), the calibration of the odor sensor 51 is executed (step S22) in same manner as explained with reference to FIG. 4.

The machining of the workpiece is started (step S23) and the gas detector 50 detects whether there is an anomaly. When there is no anomaly, the machining is continued (step S30), and completed.

When an anomaly is detected (Yes at step S24), the odor sensor 51 outputs the anomaly detection signal to the control notification section 61. The control notification section 61 determines as to how many times the anomaly detection signal is notified after the laser beam machining apparatus is booted (step S25). When the anomaly detection signal is a first one ("first" at step S25), the control notification section 61 notifies information that shows an inspection of the compressor 42 and its vicinity (step S26) so that this information is displayed on the anomaly display section 62. The operator makes the inspection according to the information (step S27). Since the inspection of the compressor 42 and its vicinity by the operator is similar to that in the first embodiment, the explanation thereof is omitted.

After the inspection and the replacement are completed by the operator, the sequence returns to step S24, and the odor sensor 51 detects anomaly due to the impure gas in the purge gas. When the odor sensor 51 detects the anomaly due to the impure gas in the purge gas (Yes at step S24), the odor sensor 51 outputs the anomaly detection signal to the control notification section 61. The control notification section 61 determines as to how many times the anomaly detection signal is notified after the laser beam machining apparatus is booted (step S25). Since the anomaly detection signal is a second one here ("second" at step S25), the control notification section 61 notifies information shows that an inspection of parts of the laser beam machining apparatus other than the compressor 42 and its vicinity is necessary to the anomaly display section 62 (step S28) so that this information is displayed on the anomaly display section 62.

When the information is received, the operator judges whether the machining can be executed without affecting the machining quality in the state where the output of the laser oscillator 11 is lowered, and the state of the laser oscillator 11 is controlled based on the judged result (step S29). When the laser machining is possible like the first embodiment, the control notification section 61 adjusts the output of the laser oscillator 11 to a level where the machining quality is not affected and the machining is continued. When the continuation of the machining is difficult, the laser oscillator 11 is stopped. After the laser oscillator 11 is stopped, the operator inspects parts in the laser machining apparatus, such as the transmission line parts including the pipes 31a and 31b and the bellows 33 of the optical duct 30 to be the transmission line of the laser beam L except for the inspected and replaced compressor 42, and the machine such as the frame 23 and the laser oscillator 11. When anomaly is detected, an anomalous part is replaced, and the process is ended.

According to the second embodiment, the odor sensor 51 is positioned near the purge gas supply port 35 of the optical duct 30, and the anomaly detection signal detected by the odor sensor 51 is output to the control notification section 61. The odor sensor 51 can, therefore, detect intrusion of the impure gas due to atmospheric gas in the compressor 42 or its vicinity, and its cause can be checked upon effectively. The replacement timing of the filter 43 to be mounted to the inlet port of the compressor 42 can be determined by the information notified from the control notification section 61, and the valve 44 can be switched from the compressor 42 to the nitrogen supply section 41. The laser oscillator 11 can be controlled based on the anomaly detection signal from the control notification section 61.

Figure 7:
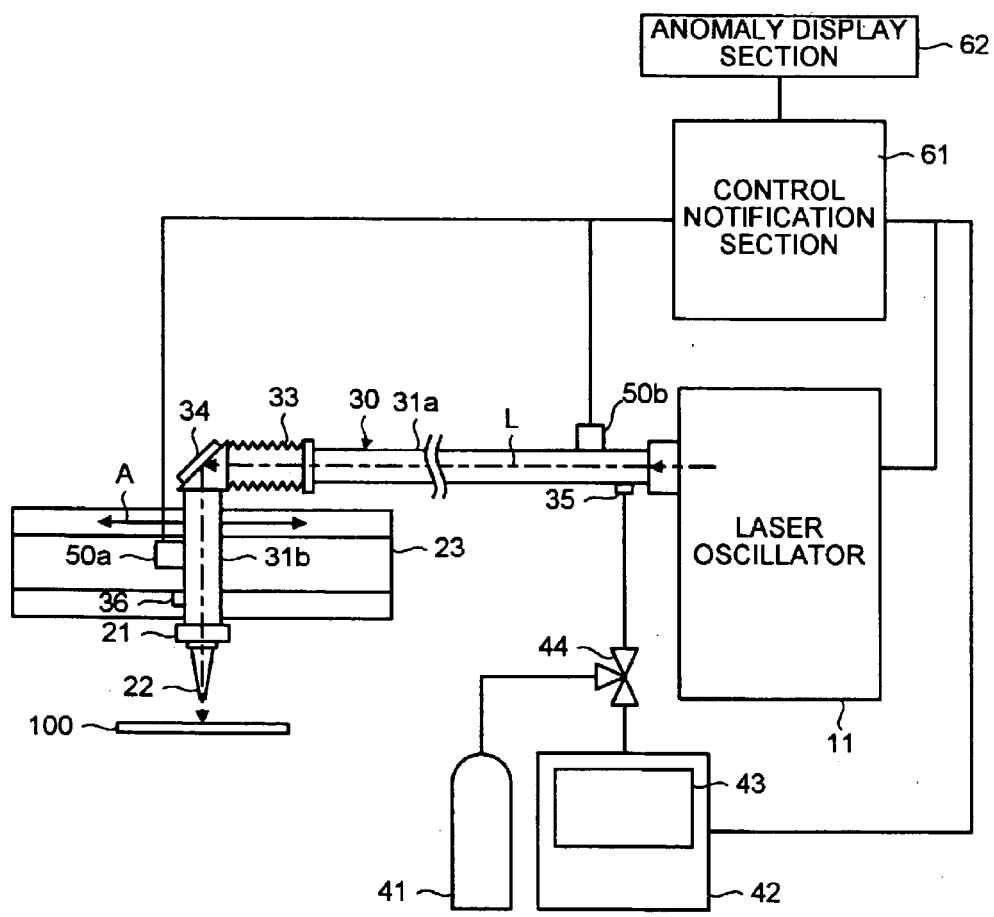
FIG. 7 is a schematic diagram of a laser beam machining apparatus according to a third embodiment of the present invention.
Figure 9:
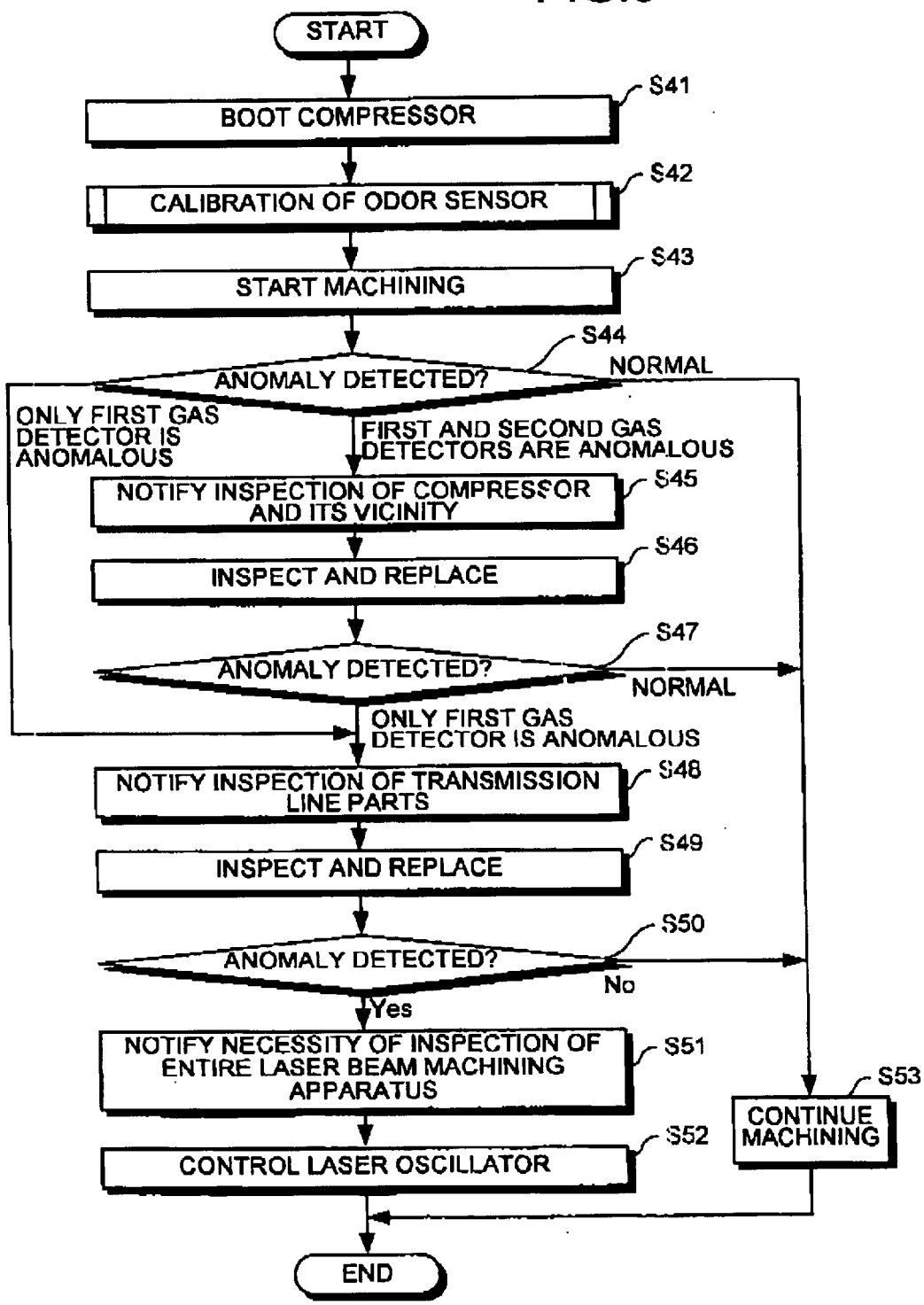
FIG. 9 is a flowchart of a process to detect an anomaly in the laser beam machining apparatus according to the third embodiment.

FIG. 7 is a schematic diagram of a laser beam machining apparatus according to a third embodiment of the present invention. FIG. 8 is to explain how the odor sensor detects anomalous portions. FIG. 9 is a flowchart of a process to detect an anomaly in the laser beam machining apparatus according to the third embodiment. Components which have same or similar configuration or same or similar functions as those in FIG. 1 are designated by the same reference numbers, and the explanation thereof is omitted.

As shown in FIG. 7, in the laser beam machining apparatus of the third embodiment, a first gas detector 50a is provided near the purge gas exhaust port 36, and a second gas detector 50b is provided near the purge gas supply port 35. Although not shown, the first and second gas detectors may be provided in plurality. The other parts of the configuration are the same as those in FIG. 1. A position where the second gas detector 50b is provided is desirably a portion in the optical duct 30 opposed to the purge gas supply port 35 or its slightly lower stream side. The gas detectors 50a and 50b are, as shown in FIG. 2 of the first embodiment, arranged on the concave portion 70 of the optical duct 3.0.

FIG. 8 is a diagram of causes which are conceivable from anomaly detection conditions of the first gas detector and the second gas detector. In the drawing, a circle means that an anomaly is not detected, and a cross means that an anomaly is detected. When both the first and the second gas detectors 50a and 50b do not detect an anomaly, it means that no impure gas flows into the optical duct 30, and thus the machining process can be continued. When the first gas detector 50a detects an anomaly and the second gas detector 50b does not detect an anomaly, a determination can be made that its first cause is impure gas which is intruded from the transmission line parts. When both the first and the second gas detectors 50a and 50b detect anomaly, a determination can be made that its first cause is anomaly of atmosphere around the compressor 42 or anomaly of the filter 43 of the compressor 42. A determination can be made that its second cause is the impure gas which is intruded from the transmission line parts.

The first gas detector 50a is provided near the purge gas exhaust port 36 on the optical duct 30, and the second gas detector 50b is provided near the purge gas supply port 35 on the optical duct 30. The determination can be made whether the cause of the intrusion of the impure gas is the atmosphere around the compressor 42, the filter 43 of the compressor 42, or the transmission line parts.

The process of detecting anomaly in the laser beam machining apparatus is explained below with reference to the flowchart of FIG. 9. The same process as steps S1 to S3 explained in FIG. 3 of the first embodiment is executed, so that the machining by the laser beam machining apparatus is started (steps S41 to S43). That is to say, after the compressor 42 is booted and the optical duct 30 is filled with gas (air), the calibration of the odor sensor 51 is executed, and the machining is started. The calibration of the odor sensor 51 is executed in the procedure explained in FIG. 4 of the first embodiment.

During the laser beam machining, the odor sensors 51 of the first and the second gas detectors 50a and 50b continue to detect intrusion of the impure gas in the optical duct 30 (step S44). When the two gas detectors 50a and 50b do not detect anomaly ("normal" at step S44), the machining is continued (step S53). The process ends when the machining process is completed.

When the first and the second gas detectors 50a and 50b detect anomaly due to the impure gas intruded in the purge gas in the optical duct 30 ("the first and the second gas detectors detect anomalies"" at step S44), the first and the second gas detectors 50a and 50b output anomaly detection signals to the control notification section 61. The control notification section 61 notifies information showing that the compressor 42 and its vicinity are inspected to the anomaly display section 62 (step S45), so that this information is displayed on the anomaly display section 62. The operator makes an inspection according to the information and rep accs the parts if necessary (step S46). Since the inspection and the replacement of the compressor 42 and its vicinity by the operator are the same as those in the first embodiment, the explanation thereof is omitted.

When the two gas detectors 50a and 50b do not detect anomaly due to the impure gas in the purge gas ("normal" at step S47), the machining process is continued (step S53). The process ends after the machining process is completed.

Meanwhile, when the first gas detector 50a detects anomaly due to the impure gas in the purge gas ("only the first gas detector detects an anomaly" at step S47), or when only the first gas detector detects anomaly at step S44 ("only the first gas detector detects an anomaly"" at step S44), the first gas detector 50a outputs the anomaly detection signal to the control notification section 61. The control notification section 61 notifies information showing that the transmission line parts are inspected to the anomaly display section 62 (step S481, so that this information is displayed on the anomaly display section 62. The operator makes an inspection based on the information, and replaces the parts if necessary (step S4'). Specifically, the operator inspects the transmission line parts such as the pipes 31a and 31b and the bellows 33 of the optical duct 30 to be the transmission line of the laser beam L for turning or deterioration. When anomaly is found, the operator replaces an anomalous part.

After the inspection and the replacement by the operator are completed, the two gas detectors 50a and 50b detect impure gas in the optical duct 30 (step S50). When the gas detectors 50a and 50b do not detect anomaly due to impure gas in the purge gas (No at step S50), the machining process is continued (step S53). The process ends after the machining process is completed. At least one of the gas detectors 50a and 50b detects the anomaly due to the impure gas in the purge gas (Yes at step S50), the gas detector 50a or 50b which detects the anomaly outputs the anomaly detection signal to the control notification section 61. The control notification section 61 notifies information showing that the inspection of the entire laser beam machining apparatus is necessary to the anomaly display section 62 (step S51), and this information is displayed on the anomaly display section 62.

When this information is received, the operator judges whether the machining can be executed without affecting the machining quality in the state where the output of the laser oscillator 11 is lowered, and controls the state of the laser oscillator 11 based on the judged result (step S52). When the laser beam machining is possible like the first embodiment, the control notification section 61 adjusts the output of the laser oscillator 11 to a level where the machining quality is not affected so that the machining is continued. When the continuation of the machining is difficult, the laser oscillator 11 is stopped. After the laser oscillator 11 is stopped, the operator inspects the parts in the laser beam machining apparatus, such as the machine including the frame 23 and the laser oscillator 11 except for the inspected and replaced compressor 42 and the optical duct 30. When anomaly is found, an anomalous part is replaced, and the process is ended.

According to the third embodiment, the odor sensor 51 is provided near the purge gas exhaust port 36 and the purge gas supply port 35, so as to be capable of detecting intrusion of the impure gas in the purge gas. A determination can be made whether its cause is the compressor 42 or the transmission line parts. As a result, a location as the cause of the anomalous laser beam L can be checked upon effectively. The anomaly due to the intrusion of the impure gas is output to the control notification section 61, so that the replacement timing of the filter 43 attached to the inlet port of the compressor 42 can be determined, and anomalies such as burning and deterioration of the transmission line parts can be easily found. The laser oscillator 11 can be controlled based on the anomaly detection signal from the control notification section 61.

Figure 10:
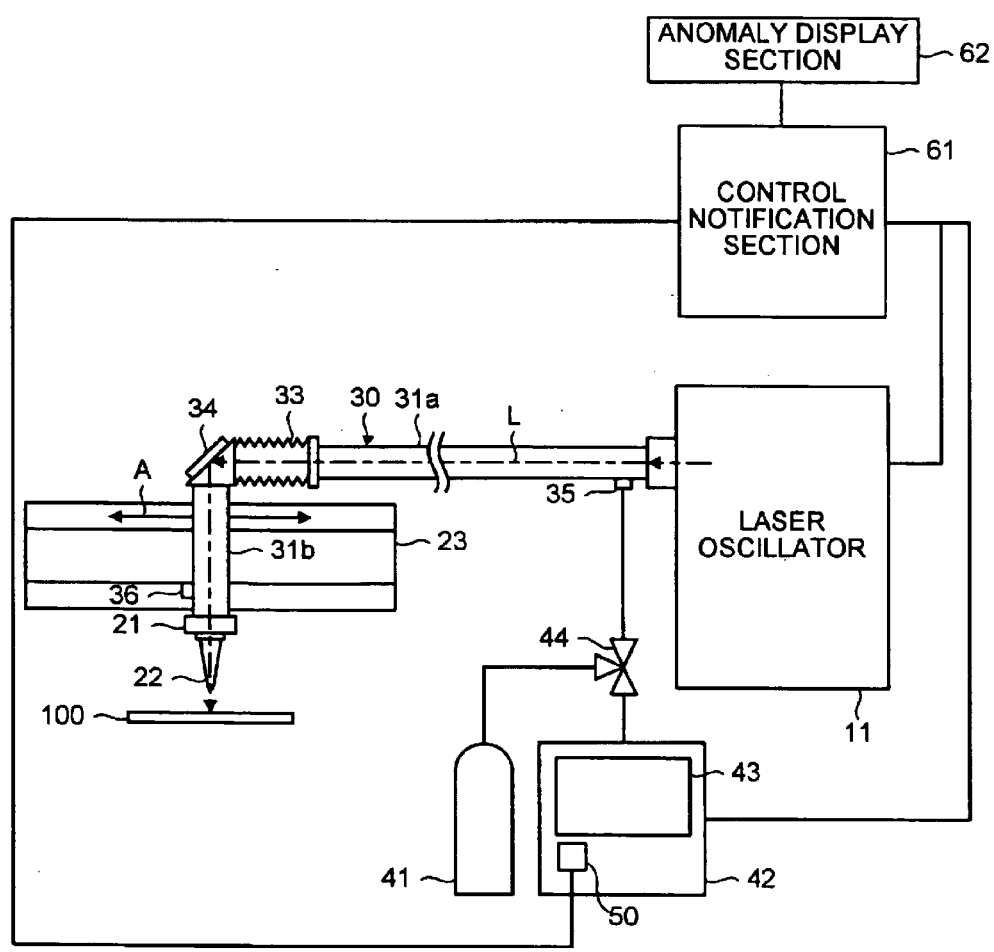
FIG. 10 is a schematic diagram of a laser beam machining apparatus according to a fourth embodiment of the present invention.
Figure 11:
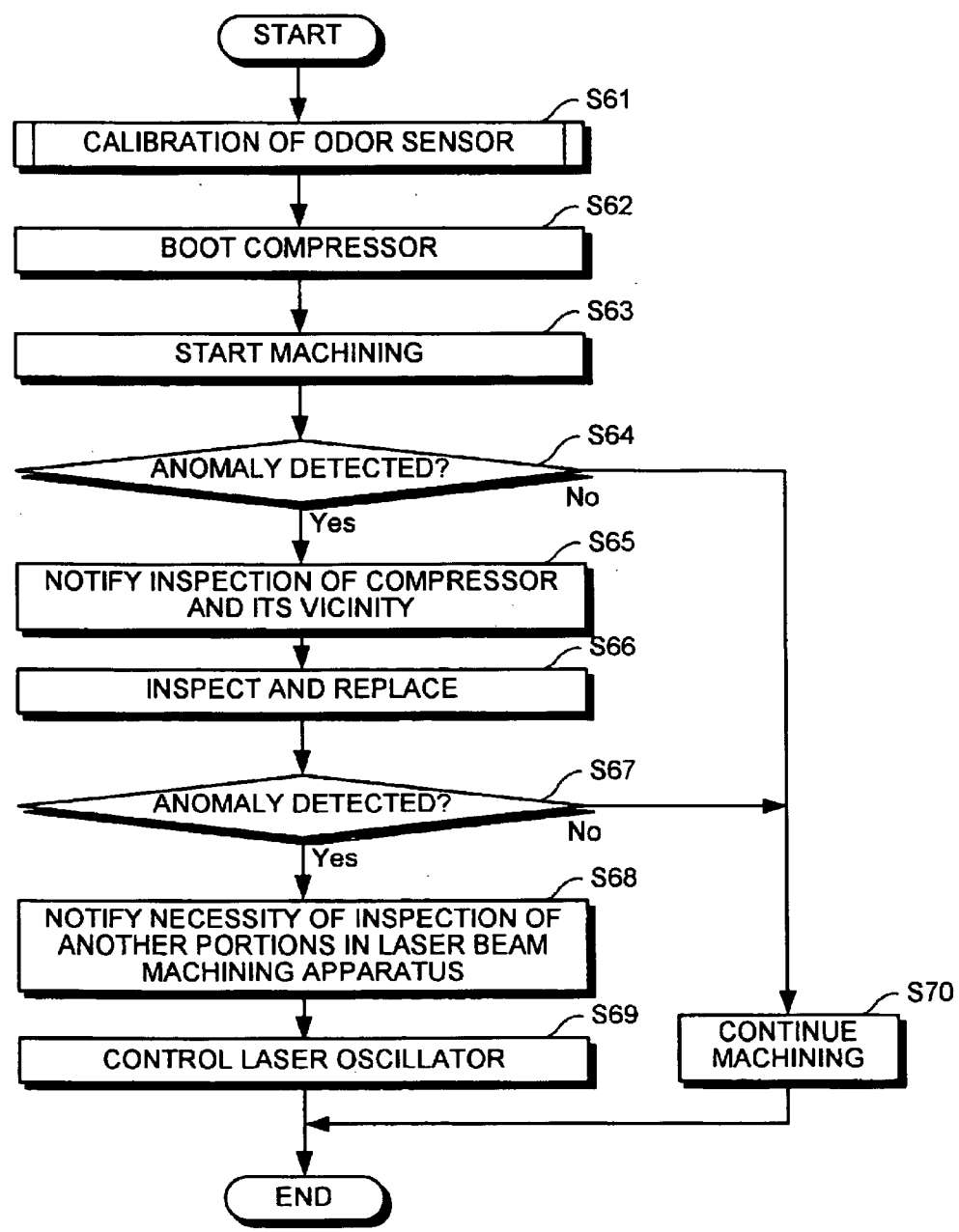
FIG. 11 is a flowchart of a process to detect an anomaly in the laser beam machining apparatus according to the fourth embodiment.

FIG. 10 is a schematic diagram of a laser beam machining apparatus according to a fourth embodiment of the present invention. FIG. 11 is a flowchart of a process to detect an anomaly in the laser beam machining apparatus according to the fourth embodiment. Components which have same or similar configuration or same or similar functions as those in FIG. 1 are designated by the same reference numbers, and the explanation thereof is omitted.

As shown in FIG. 10, in the laser beam machining apparatus of the fourth embodiment, a gas detector 50 is provided near the inlet port of the compressor 42. Although not shown, the gas detector may be provided in plurality. The other parts of the configuration are the same as those in FIG. 1. The gas detector 50 is provided near the inlet port of the compressor 42, so as to detect the impure gas intruded from the compressor 42 immediately.

The process of detecting the anomaly in the laser beam machining apparatus is explained below with reference to the flowchart in FIG. 11. The calibration of the odor sensor 51 is executed for predetermined time (step S61), and after the compressor 42 is booted and the optical duct 30 is filled with gas (air) (step S62), the machining is started (step S63). The calibration of the odor sensor 51 is executed in the procedure explained in FIG. 4 of the first embodiment.

The gas detector 50 detects anomaly of the atmosphere around the compressor 42 in a room (step S64), and when impure gas is not detected around the compressor 42 (No at step S64), the machining is continued (step S70). After the machining process is completed, the detecting process is ended.

Meanwhile, when the impure gas is detected around the compressor 42 (Yes at step S64), the odor sensor 51 outputs the anomaly detection signal to the control notification section 61. The control notification section 61 notifies-information showing that the compressor 42 and its vicinity are inspected to the anomaly display section 62 (step S65), and this information is displayed on the anomaly display section 62. The operator makes an inspection according to the information (step S26). Since the inspection of the compressor 42 and its vicinity by the operator is the same as that in the first embodiment, the explanation thereof is omitted.

After the inspection and the replacement by the operator are ended, when the gas detector 50 does not detect anomaly of the atmosphere around the compressor 42. (No at step S67), the machining is continued (step S70). After the machining process is completed, the detecting process is ended. When the gas detector 50 detects anomaly of the atmosphere around the compressor 42 (Yes at step S67), the odor sensor 51 outputs the anomaly detection signal to the control notification section 61. The control notification section 61 notifies information showing that inspection of portions in the laser beam machining apparatus except for the compressor 42 and its vicinity is necessary to the anomaly display section 62 (step S68), and the anomaly display section 62 displays this information.

When the information is received, the operator judges whether the machining can be executed without affecting the machining quality in the state where the output of the laser oscillator 11 is lowered, and the state of the laser oscillator 11 is controlled by the control notification section based on the judged result (step S69). When the laser beam machining can be carried out like the first embodiment, the control notification section 61 adjusts the output of the laser oscillator 11 to the level where the machining quality is not affected so that the machining is continued. When the continuation of the machining is difficult, the laser oscillator 11 is stopped. After the laser oscillator 11 is stopped, the operator inspects the parts in the laser beam machining, such as the transmission line parts including the pipes 31a and 31b and the bellows 33 of the optical duct 30 to be the transmission line of the laser beam L except for the inspected and replaced compressor 42, the machine including the frame 23, and the laser oscillator 11. When anomaly is found, an anomalous part is replaced, and the process is ended. The inspection of the transmission line parts may be made when the machining is executed with the output of the laser beam being lowered.

According to the fourth embodiment, the odor sensor 51 is provided near the compressor 42 which supplies the purge gas, so as to be capable of determining anomaly of the atmosphere around the compressor 42 in a room. The operation of the laser oscillator 11 can be controlled based on the information about the anomaly. The replacement timing of the filter 43 provided to the inlet port of the compressor 42 can be determined by the anomaly detection signal output from the odor sensor 51.

Figure 12:
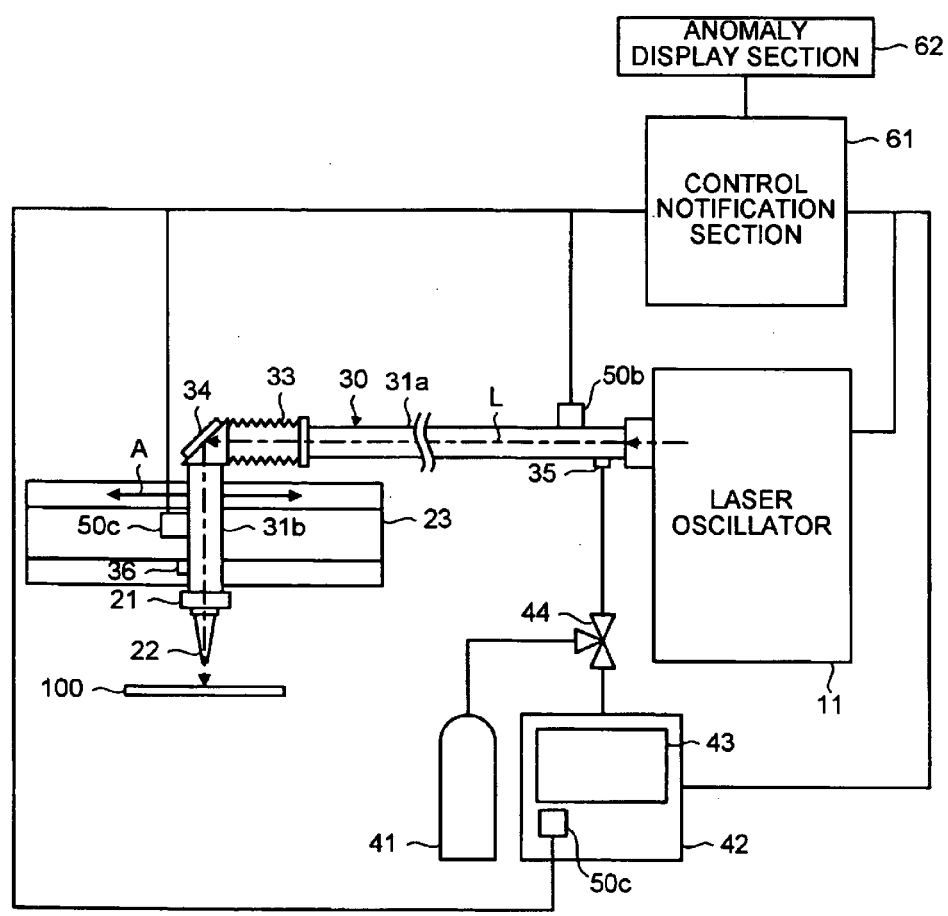
FIG. 12 is a schematic diagram of a laser beam machining apparatus according to a fifth embodiment of the present invention.

FIG. 12 is a schematic diagram of a laser beam machining apparatus according to a fifth embodiment of the present invention. FIG. 13 is to explain how the odor sensor detects anomalous portions in the laser beam machining apparatus according to the fifth embodiment. FIG. 14 is a flowchart of a process to detect an anomaly in the laser beam machining apparatus according to the fifth embodiment. Components which have same or similar configuration or same or similar functions as those in FIG. 1 are designated by the same reference numbers, and the explanation thereof is omitted.

As shown in FIG. 12, in the laser beam machining apparatus of the fifth embodiment, a first gas detector 50a is provided near the purge gas exhaust port 36, a second gas detector 50b is provided near the purge gas supply port 35, and a third gas detector 50c is provided in a vicinity of the inlet port of the compressor 42. Although not shown, the gas detectors may be provided in plurality. The other parts of the configuration are the same as those in FIG. 1. The position where the second gas detector 50b is provided is desirably a portion on the optical duct 30 opposed to the purge gas supply port 35 or its slightly lower stream side. The first and the second gas detectors 50a and 50b are arranged on the concave portion 70 provided on the optical duct 30 as shown in FIG. 2 of the first embodiment.

FIG. 13 is a diagram of the causes which are conceivable from anomaly detected conditions of the first to the third gas detectors 50a to 50c. In the drawing, similarly to FIG. 8, a circle represents the condition where anomaly is not detected, and cross represents the condition where anomaly is detected. When all the first to the third gas detectors 50a to 50C do not detect anomalies, since the impure gas does not flow into the optical duct 30, the machining process an be continued. When the first and the second gas detectors 50a and 50b do not detect anomalies and the third gas detector 50c detects an anomaly, its first cause is considered to be impure gas in the atmosphere around the compressor 42.

When the first gas detector 50a detects an anomaly and the second and the third gas detectors 50b and do not detect anomalies, a determination can be made that its first cause is anomaly of gas intruded from the transmission line parts. When the first and the third gas detectors 50a, 50c detect anomaly and the second gas detector 50b does not detect an anomaly, a determination can be made that its first cause is the atmosphere around the compressor 42 and the transmission line parts.

When the first and the second gas detectors 50a and 50b detect anomaly and the third gas detector 50c does not detect an anomaly, a determination can be made that its first cause is anomaly between the compressor 42 and the purge gas supply port 35 on the optical duct 30, and its second cause is the transmission line parts. When the first to the third gas detectors 50a to 50c detect anomaly, a determination can be made that its first cause is the atmosphere around the compressor 42, and its second cause is the anomaly between the compressor 42 and the purge gas supply port 35 on the optical duct 30, and its third cause is the transmission line parts.

The first gas detector 50a is provided near the purge gas exhaust port 36 on the optical duct 30, the second gas detector 50b is provided near the purge gas supply port 35 on the optical duct 30, and the third gas detector 50c is provided near the inlet port of the compressor 42. Consequently, a determination can be made whether the cause of the intrusion of the impure gas is anomaly due to the atmosphere around the compressor 42, the compressor 42, or the transmission line parts.

A countermeasure against the anomaly due to the intrusion of the impure gas in the laser beam machining apparatus is taken from the upper stream side of the purge gas, namely, in order of the compressor 42 and its vicinity, and the transmission line parts. A countermeasure method against the causes of the anomaly in FIG. 13 can be roughly classified into two, and when the normal time is added the method can be classified into three. That is to say, the method can be classified into three: (A) the countermeasure when all the gas detectors 50a to 50c are normal; (B) the countermeasure when at least one of the second and the third detectors 50b and 50c detects anomaly (the cause is the compressor 42 and its vicinity); and (C) the countermeasure when only the first gas detector 50a detects anomaly (the cause is the transmission line parts).

The process of detecting anomaly in the laser beam machining apparatus is explained with reference to the flowchart of FIG. 14. The same process as steps S61 to S63 explained in FIG. 11 of the fourth embodiment is executed, so that the machining is started by the laser beam machining apparatus (step S81 to S83). That is to say, the calibration of the odor sensor 51 is executed for predetermined time, and after the compressor 42 is booted and the optical duct 30 is filled with gas (air), the machining is started. The calibration of the odor sensor 51 is executed in the procedure explained in FIG. 4 of the first embodiment.

During the laser beam machining, the odor sensors 51 of the first to the third gas detectors 50a to 50c continue to detect impure gas (step S84). When all the gas detectors 50a to 50c detect no anomaly, ("all the gas detectors are normal" at step S84), the machining is continued (step S93). The process ends after the machining process is completed.

When at least one of the second and the third gas detectors 50b and 50c detects anomaly ("at least one of the second and the third gas detectors detects anomaly" at step S84), the anomaly detection signal is output from any one of the second gas detector 50b and the third gas detector 50c or both to the control notification section 61. The control notification section 61 notifies information that shows the compressor 42 and its vicinity are inspected to the anomaly display section 62 (step S85), and the anomaly display section 62 displays this information. The operator makes an inspection according to the information (step S86). Since the inspection of the compressor 42 and its vicinity by the operator are the same as those in the first embodiment, the explanation thereof is omitted.

When the three gas detectors 50a to 50c do not detect anomaly due to the impure gas ("all the gas detectors are normal" at step S87), the machining process is continued (step S93). The process ends after the machining process is completed.

Meanwhile, when only the first gas detector 50a detects anomaly due to the impure gas in the purge gas ("only the first gas detector detects anomaly" at step S87), or when the only the first gas detector 50a detects anomaly at step S84 ("only the first gas detector detects anomaly" at step S84), the first gas detector 50a outputs the anomaly detection signal to the control notification section 61. The control notification section 61 notifies information showing that the transmission line parts are inspected to the anomaly display section 62 (step S48), this information is displayed on the anomaly display section 62. The operator makes an inspection according to the information (step S89). The operator inspects the transmission line parts such as the pipes 31a and 31b, and the bellows 33 of the optical duct 30 to be the transmission line of the laser beam L for burning and deterioration, and when anomaly is found, the operator replaces an anomalous part.

After the inspection and the replacement by the operator is ended, the gas detectors 50a to 50c detect impure gas in the optical duct 30 (step S90). When the gas detectors 50a to 50c do not detect the anomaly due to the impure gas (No at step S90), the machining process is continued (step S93). The process ends after the machining process is completed.

When the gas detectors 50a to 50c detect the anomaly due to the impure gas in the purge gas (Yes at step S90), the gas detectors 50a to 50c which detect anomaly output the anomaly detection signal to the control notification section 61. The control notification section 61 notifies information showing that the inspection of the entire laser beam machining apparatus is necessary to the anomaly display section 62 (step S91), and this information is displayed on the anomaly display section 62.

When the information is received, the operator judges whether the machining can be executed without affecting the machining quality in the state where the output of the laser oscillator 11 is lowered. The control notification section 61 controls the state of the laser oscillator 11 based on the judged result (step S92). When the laser machining can be executed like the first embodiment, the control notification section 61 adjusts the output of the laser oscillator 11 to the level where the machining quality is not affected, so that the machining is continued. When the continuation of the machining is difficult, the laser oscillator 11 is stopped. After the laser oscillator 11 is stopped, the operator inspects the parts in the laser beam machining apparatus, such as the machine including the frame 23, and the laser oscillator 11 except for the inspected and replaced compressor 42 and the optical duct 30. When anomaly is found, an anomalous part is replaced, and the process is ended.

According to the fifth embodiment, the odor sensor 51 is provided near the purge gas exhaust port 36, near the purge gas supply port 35, and near the inlet port of the compressor 42. The intrusion of the impure gas can be, therefore, detected, and a determination can be made whether its cause is the atmosphere around the compressor 42 in a room, the compressor 42, or the transmission line. As a result, a location which is the cause of the anomalous laser beam L can be checked upon effectively. The anomaly due to the intrusion of the impure gas is output to the control notification section 61, so that the replacement timing of the filter attached to the inlet port of the compressor 42, and the detected anomaly such as burning and deterioration of the transmission line parts can be known easily. The laser oscillator 11 can be controlled based on the anomaly detection signal from the control notification section 61.

The fifth embodiment explains that the odor sensor 51 provided near the purge gas supply port 35, near the purge gas exhaust port 36, and near the inlet port of the compressor 42. Even if, however, the odor sensor 51 is provided near the purge gas supply port 35 and near the inlet port of the compressor 42, or the odor sensor 51 is provided near the purge gas exhaust port 36 and near the inlet port of the compressor 42, namely, providing positions and a number of the odor sensors are changed, the effect explained in the first to fourth embodiments can be obtained.

The first to fifth embodiments explain the configuration where the machining head 21 stands in vertical state, but the machining head 21 may lie in a horizontal state, or the machining head 21 may rotate or tilt. The first to fifth embodiments explain that the machining head 21 is movable only to a right-left direction, but the machining head 21 may be movable to a vertical direction with respect to a sheet, may be movable to both the directions, or may be movable three-dimensionally. The optical duct 30 from the laser oscillator 11 to the machining head 21 which guides the laser beam L may have not an L shape in the first to fifth embodiments but an arbitrary shapes.

In the first to fifth embodiments, the valve 44, which selectively switches between the compressor 42 and the nitrogen supply section 41 so as to guide sucked and compressed air from the compressor 42 or nitrogen gas from the nitrogen supply section 41 to the optical duct 30, is provided, and the filter 43 is attached to the inlet port of the compressor 42. The valve 44 and the filter 43 are not, however, necessarily provided, or even if only one of them is provided, the effect which is similar to that in the first to fifth embodiments can be obtained.

In the first to fifth embodiments, the purge gas supply port 35 is provided near the laser outgoing port 12 of the laser oscillator 11 on the optical duct 30, and the purge gas exhaust port 36 is provided near the attached position of the machining head 21 of the optical duct 30. On the contrary, the purge gas supply port 35 may be provided near the attached position of the machining head 21 of the optical duct 30, and the purge gas exhaust port 36 may be provided near the laser outgoing port 12 of the laser oscillator 11 of the optical duct 30.

In the first to the third and the fifth embodiments, the gas detector 50 is provided on the optical duct 30 as shown, for example, in FIG. 2. In a sixth embodiment, however, the gas detector 50 is provided on the optical duct 30 in a different form from FIG. 2.

Figure 15:
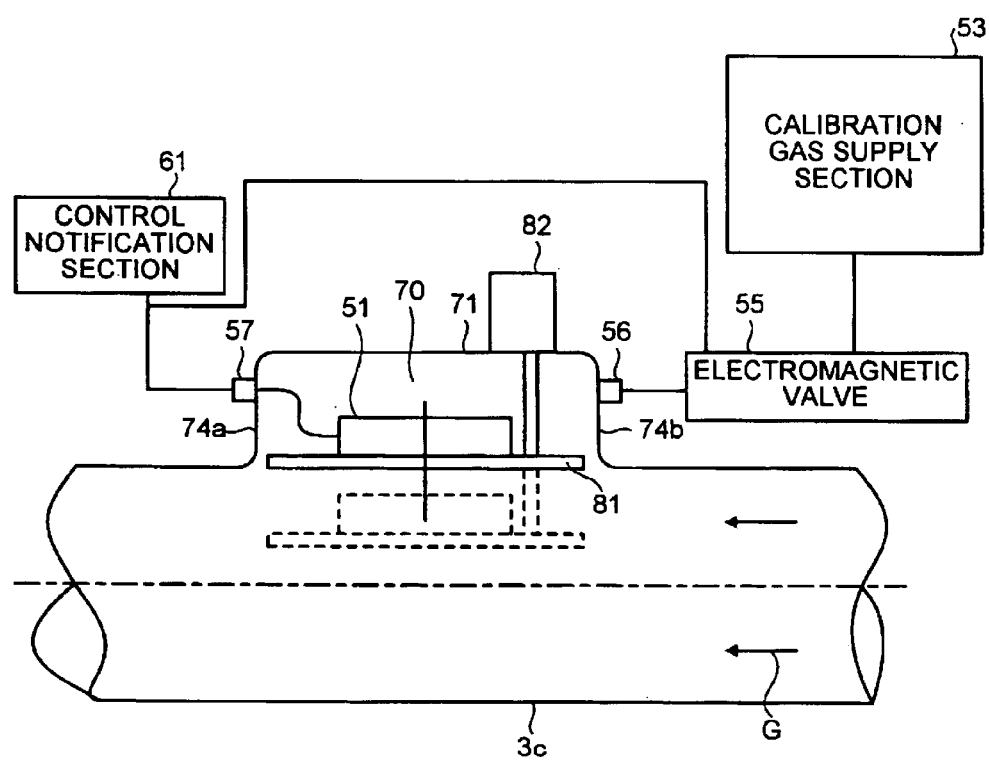
FIG. 15 illustrates an example in which the gas detector is attached to the optical duct.
Figure 16:
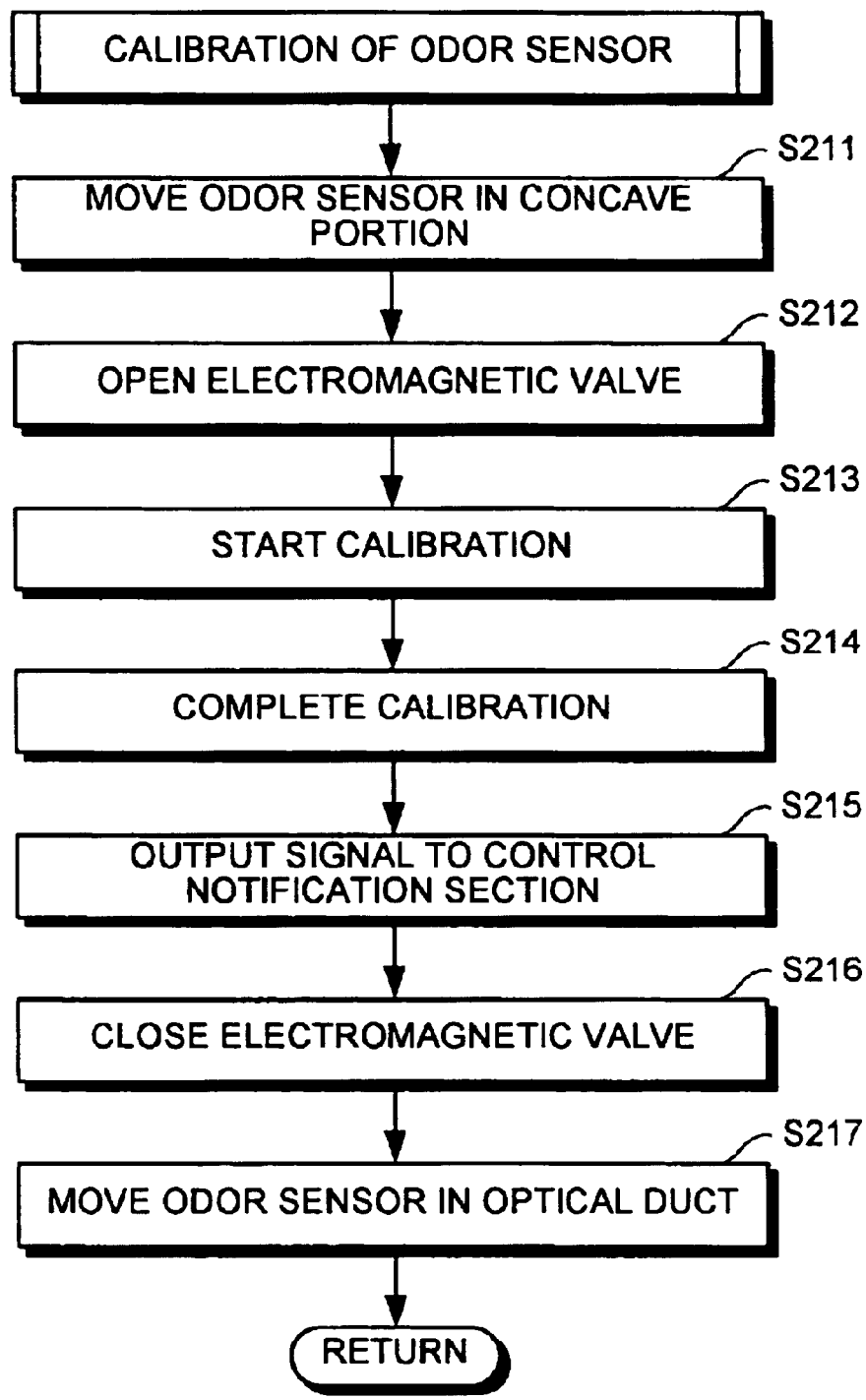
FIG. 16 is a flowchart of a process of calibration executed using the gas detector.

FIG. 15 illustrates an example in which the gas detector is attached to the optical duct. FIG. 16 is a flowchart of a process of calibration executed using the gas detector.

As shown in FIG. 15, the gas detector 50 is provided on the concave portion 70 which is formed in such a manner that a part of the side wall of the optical duct 30 is recessed from the inside to the outside of the optical duct 30. The concave portion 70 has a surface parallel with the optical axis in the optical duct 30, and is surrounded by the peripheral surface 71 connected with the optical duct 30 and two side surfaces 74a and 74b which connect the outer peripheral surface of the optical duct 30 with the peripheral surface 71 of the concave portion 70. The side surfaces 74a and 74b of the concave portion 70 has an angle that is approximately vertical to the extended direction of the optical duct 30.

The odor sensor 51 of the gas detector 50 is fixed to an installation base 81. The installation base 81 is connected with a driving mechanism 82 such as a motor or an air cylinder, and is movable to an up-down direction on the sheet between the concave portion 70 and a position where the optical axis of the laser beam L in the optical duct 30 is not disturbed. The installation stand 81 has a dimension which is the approximately same as that of an opening of the concave portion 70. At the time of the calibration, the installation stand 81 is moved by the driving mechanism 82 so that its surface opposite to the odor sensor 51 forms a part of the inner wall of the optical duct 30 as drawn by a solid line in FIG. 15 and the odor sensor 51 is housed in the concave portion 70. During the laser beam machining, the installation stand 81 is moved by the driving mechanism 82 to a position in the optical duct 30 where the optical path of the laser beam L is not disturbed as drawn by a dotted line in FIG. 15.

The sensor calibrator has the calibration gas supply section 53 which supplies calibration gas, a gas supply opening 56 which emits the calibration gas into the concave portion 70, and the electromagnetic valve 55 which supplies the calibration gas into the optical duct 30 at the time of executing the calibration and does not supply the calibration gas into the optical duct 30 at the other time. Similarly to FIG. 2 of the first embodiment, the gas supply opening 56 is attached to the side surface 74b positioned on the upper stream side of the concave portion 70. A gas exhaust port 57 which exhausts the calibration gas is provided on the side surface 74a of the concave portion 70 opposed to the gas supply opening 56. The gas exhaust port 57 is opened only during the calibration, and is closed during the laser beam machining. The odor sensor 51 is connected with the control notification section 61 via the gas exhaust port 57.

The operation of the odor sensor is explained below with reference to FIG. 16. In order to execute the calibration, the odor sensor 51 is moved by the driving mechanism 82 to a predetermined position in the concave portion 70 (step S211). The process which is the same as steps S201 to 205 in FIG. 4 is executed, so that the calibration of the odor sensor 51 is executed (steps S212 to S216). That is to say, the electromagnetic valve 55 which is provided between the calibration gas supply section 53 and the gas supply opening 56 is opened, and the calibration gas is emitted from the gas supply opening 56 to the odor sensor 51, so that the calibration is started. The calibration gas is emitted to the odor sensor 51 for predetermined time (normally a few minutes), and when the calibration is ended, the odor sensor 51 outputs a signal that shows the completion of the calibration to the control notification section 61, so that the control notification section 61 closes the electromagnetic valve 55.

The odor sensor 51 is moved by the driving mechanism 82 to the predetermined position in the optical duct 30, and the calibration process is ended (step S217).

The configuration of the gas detector 50 in the optical duct 30 can be applied to the gas detector 50 in the first to third and fifth embodiments.

According to the sixth embodiment, at the time of the calibration of the odor sensor 51, the installation stand 81 is moved so as to cover the opening of the concave portion 70, and the calibration gas is allowed to flow into a space surrounded by the concave portion 70 and the installation stand 81. As a result, a quantity of the calibration gas to be used at the time of the calibration can be suppressed.

In the first through third embodiments and the fifth embodiment, the gas detector 50 is provided on the optical duct 30, for example, as shown in FIG. 2. A seventh embodiment explains that the gas detector 50 is provided in the optical duct 30 in a form different from FIG. 2.

Figure 17:
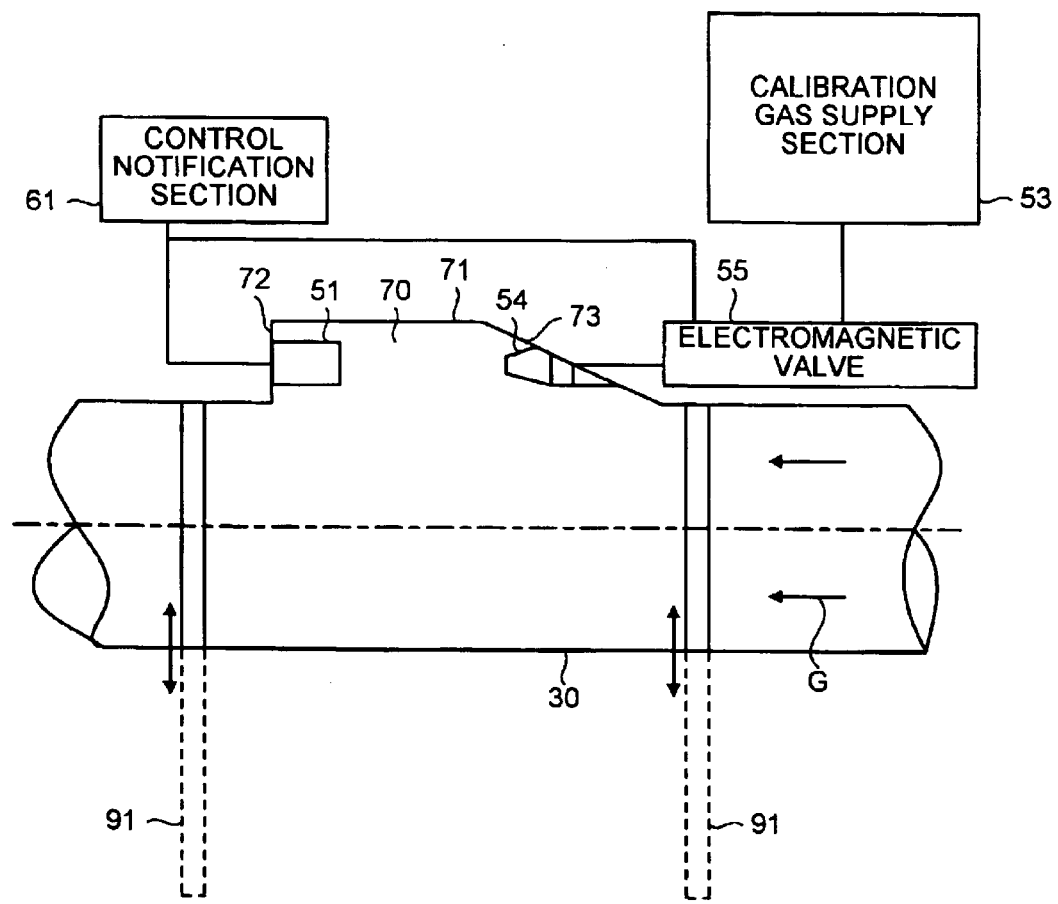
FIG. 17 illustrates an example in which the gas detector is mounted to the optical duct.
Figure 18:
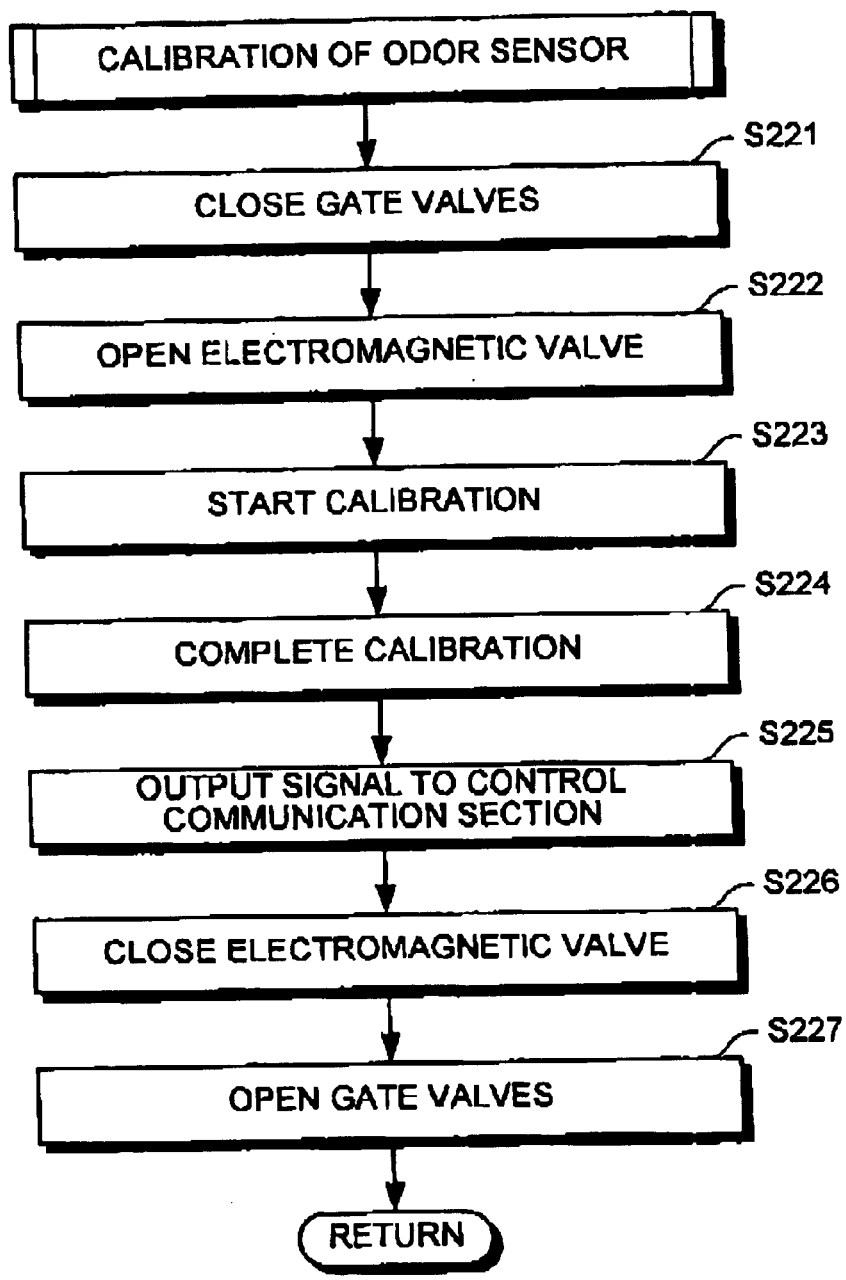
FIG. 18 is a flowchart of a process of calibration executed using the gas detector.

FIG. 17 illustrates an example in which the gas detector is mounted to the optical duct, and FIG. 18 is a flowchart of a process of calibration executed using the gas detector. The components which are the same as those in FIG. 2 are designated by the same reference numbers, and the explanation thereof is omitted.

As shown in FIG. 17, gate valves 91 are provided on the optical duct 30 on the upper stream side and the lower stream side of the concave portion 70 so that the gas detector 50 of the seventh embodiment forms a closed space in the optical duct 30 provided with the concave portion 70 in FIG. 2 of the first embodiment.

When the odor sensor 51 is calibrated, the two gate valves 91 are closed so that the space in the optical duct 30 where the concave portion 70 is provided is a closed space, and the calibration gas is supplied from the calibration gas supply section 53 into the space. After the calibration is ended, the gate valves 91 are opened, and the laser beam machining is executed.

The operation of the odor sensor 51 is explained below with reference to FIG. 18. Two gate valves 91 are closed, so that the space in the optical duct 30 where the concave portion 70 is provided is a closed space (step S221). The process which is the same as steps S201 to S206 in FIG. 4 is executed, so that the odor sensor 51 is calibrated (step S212 to S216). That is to say, the electromagnetic valve 55 provided between the calibration gas supply section 53 and the nozzle 54 is opened, and the calibration gas is emitted from the nozzle 54 onto the odor sensor 51 so that the calibration is started. When the calibration gas is emitted onto the odor sensor 51 for predetermined time (normally, a few minutes) and the calibration is ended, the odor sensor 51 outputs a calibration completion signal to the control notification section 61, and the control notification section 61 closes the electromagnetic valve 55.

The gate valves 91 provided in the optical duct 30 are opened, and the calibration process is ended (step S217).

The configuration of the gas detector 50 in the optical duct 30 can be applied to the gas detector 50 of the first to third and fifth embodiments.

According to the seventh embodiment, the gate valves 91, which form the closed space in the optical duct 30 provided with the concave portion 70, are provided, and the gate valves 91 are closed at the time of the calibration so that the calibration gas is sealed in the space in the optical duct 30 including the concave portion 70. A use quantity of the calibration gas can be suppressed in comparison with the configuration of the gas detector 50 in the first to third and fifth embodiments.

According to the present invention, the odor sensor is provided in the optical duct of the laser beam machining apparatus or at the inlet port of the compressor or the like, so as to be capable of detecting anomaly of the entire purge gas including the optical duct. As a result, the intrusion of the impure gas can be specified as a cause of the anomalous laser beam. The odor sensor outputs the anomaly detection signal to the control notification section, and a determination is made which odor sensor outputs the anomaly detection signal, or as to how many times the anomaly detection signal is notified, thereby checking upon its cause effectively. Defective machining during the machining by the laser beam machining apparatus can be, therefore, reduced, and the cause of the defective machining can be found easily.

INDUSTRIAL APPLICABILITY

The present invention is suitable to the laser beam machining apparatus which executes the machining process such as welding and cutting on a workpiece to be machined using the laser beam.

We claim:

1. A laser beam machining apparatus, comprising:
   a laser oscillator which oscillates a laser beam, the laser oscillator having a laser beam outgoing port to output the laser beam;
   a machining head which machines a workpiece with the laser beam;
   an optical duct with an optical system to guide the laser beam from the laser beam outgoing port to the machining head;
   a purge gas supply port that opens into the optical duct and situated near any one of the laser beam outgoing port and the machining head, wherein a purge gas supply unit supplies purge gas into the optical duct from the purge gas supply port;
   a purge gas exhaust port that opens into the optical duct and situated near any one of the laser beam outgoing port and the machining head, wherein the purge gas in the optical duct is output from the purge gas exhaust port; and
   an odor sensor that detects undesired gas in a portion of the optical duct from the laser beam outgoing port to the machining head, wherein the undesired gas is a gas that makes the laser beam anomalous.

2. The laser beam machining apparatus according to claim 1, further comprising a control notification unit that, upon the odor sensor detecting the undesired gas, identifies a cause of the undesired gas entering the optical duct and notifies the cause.

3. The laser beam machining apparatus according to claim 2, wherein the control notification unit includes a counter that counts number of times the odor sensor detects the undesired gas from the time the laser beam machining apparatus is booted, and
   if the count of the counter indicates that the odor sensor has detected the undesired gas for a firs: time, the control notification identifies a faulty in the purge gas supply unit and peripheral atmosphere of the purge gas supply unit as the cause.

4. The laser beam machining apparatus according to claim 2, wherein the control notification unit includes a counter that counts number of times the odor sensor detects the undesired gas from the time the laser beam machining apparatus is booted, and
   if the count of the counter indicates that the odor sensor has detected the undesired gas for a second time, the control notification unit identifies a fault in the optical duct as the cause.

5. The laser beam machining apparatus according to claim 2, wherein the control notification unit includes a counter that counts number of times the odor sensor detects the undesired gas from the time the laser beam machining apparatus is booted, and
   if the count of the counter indicates that the odor sensor has detected the undesired gas for third or more times, the control notification unit identifies a fault in the entire laser beam machining apparatus as the cause and controls an operating state of the laser oscillator.

6. The laser beam machining apparatus according to claim 1, wherein the odor sensor is situated adjacent to the purge gas exhaust port.

7. The laser beam machining apparatus according to claim 6, further comprising a control notification unit that, upon the odor sensor detecting the undesired gas, identifies a cause of the undesired gas entering the optical duct and performs any one of notifying the cause and notifying the cause and controlling an operating state of the laser oscillator based on number of times the odor sensor detects the undesired gas from the time the laser beam machining apparatus is booted.

8. The laser beam machining apparatus according to claim 1, wherein the odor sensor is situated adjacent to the purge gas supply port.

9. The laser beam machining apparatus according to claim 8, further comprising a control notification unit that, upon the odor sensor detecting the undesired gas, identifies a cause of the undesired gas entering the optical duct and performs any one of notifying the cause and notifying the cause and controlling an operating state of the laser oscillator based on number of times the odor sensor detects the undesired gas from the time the laser beam machining apparatus is booted.

10. The laser beam machining apparatus according to claim 1, wherein the odor sensor includes a first odor sensor situated adjacent to the purge gas exhaust port, and a second odor sensor situated adjacent to the purge gas supply port.

11. The laser beam machining apparatus according to claim 10, further comprising a control notification unit that, upon any one of the first odor sensor and the second odor sensor detecting the undesired gas, identifies a cause of the undesired gas entering the optical duct and performs any one of notifying the cause and notifying the cause and controlling an operating state of the laser oscillator based on number of times the first odor sensor and the second odor sensor detect the undesired gas from the time the laser beam machining apparatus is booted, and based on which one of the first odor sensor and the second odor sensor has detected the undesired gas.

12. The laser beam machining apparatus according to claim 11, wherein the purge gas supply unit has an inlet port to suck air, a filter to filter dust from the air and obtain dust-free air, and a compressor to compress the dust-free air and supply the compressed dust-free air to the optical duct, and
   when the second odor sensor detects the undesired gas for a first time after the laser beam machining apparatus is booted, the control notification identifies a faulty in the purge gas supply unit and peripheral atmosphere of the purge gas supply unit as the cause.

13. The laser beam machining apparatus according to claim 12, further comprising:
   a second purge gas supply unit that is situated in a flow channel connecting the compressor and the purge gas supply port via a valve which selectively switches the purge gas between the purge gas supply unit and the compressor,
   the control notification unit switches the valve so that, when ally one of the first odor sensor and the second odor sensor detects the undesired gas when the purge gas is supplied from the compressor to the optical duct, the purge gas is supplied from the second purge gas supply unit to the optical duct.

14. The laser beam machining apparatus according to claim 1, wherein the purge gas supply unit has an inlet port to suck air, a filter to filter dust from the air and obtain dust-free air, and a compressor to compress the dust-free air and supply the compressed dust-free air to the optical duct, and The odor sensor includes a first odor sensor situated adjacent to the purge gas exhaust port, a second odor sensor situated adjacent to the purge gas supply port, and a third odor sensor situated adjacent to the inlet port of the purge gas supply unit.

15. The laser beam machining apparatus according to claim 14, further comprising a control notification unit that, upon any one of the first odor sensor, the second odor sensor, and the third odor sensor detecting the undesired gas, identifies a cause of the undesired gas entering the optical duct and performs any one of notifying the cause and notifying the cause and controlling an operating state of the laser oscillator based on number of times the first odor sensor, the second odor sensor, and the third odor sensor detect the undesired gas from the time the laser beam machining apparatus is booted, and based on which one of the first odor sensor, the second odor sensor, and the third odor sensor has detected the undesired gas.

16. The laser beam machining apparatus according to claim 1, wherein the optical duct includes a concave portion to fit the odor sensor.

17. The laser beam machining apparatus according to claim 16, further comprising a calibration gas supply unit gas supply unit situated near the odor sensor, wherein the calibration gas supply unit ejects calibration gas towards the odor sensor for calibrating the odor sensor.

18. The laser beam machining apparatus according to claim 17, further comprising a driving unit which moves the odor sensor sufficiently inside the concave portion when the odor sensor is being calibrated, and moves the odor sensor inside the conducting arrangement until the odor sensor does not disturb the path of the laser beam in the conducting arrangement when the workpiece is to be machined with the laser beam.

19. The laser beam machining apparatus according to claim 17, further comprising two gate valves in positions on the optical duct sandwiching the concave portion, wherein the gate valves are closed when the odor sensor is being calibrated.

* * * * *